(12) United States Patent
Baker, Jr.

(10) Patent No.: US 6,784,591 B2
(45) Date of Patent: Aug. 31, 2004

(54) GRAVITATIONAL WAVE GENERATOR UTILIZING SUBMICROSCOPIC ENERGIZABLE ELEMENTS

(76) Inventor: Robert M. L. Baker, Jr., 8123 Tuscany Ave., Playa del Rey, CA (US) 90293

( * ) Notice: Subject to any disclaimer, the term of this patent is extended or adjusted under 35 U.S.C. 154(b) by 54 days.

(21) Appl. No.: 09/752,975

(22) Filed: Dec. 27, 2000

(65) Prior Publication Data

US 2001/0006317 A1 Jul. 5, 2001

Related U.S. Application Data

(63) Continuation-in-part of application No. 09/616,683, filed on Jul. 14, 2000, now Pat. No. 6,417,597, which is a continuation-in-part of application No. 09/443,527, filed on Nov. 19, 1999, now Pat. No. 6,160,336.

(51) Int. Cl.[7] ........................ G21H 1/00; H04B 13/00; H01L 41/00
(52) U.S. Cl. ....................... 310/300; 310/301; 310/311; 250/493.1; 250/526; 455/899; 976/403; 976/410
(58) Field of Search ................................ 310/301, 300, 310/311; 976/DIG. 315, DIG. 410, DIG. 103, DIG. 396, DIG. 398, DIG. 401, DIG. 402, DIG. 419, DIG. 427; 250/396 R, 397, 472.1, 493.1, 526; 376/156, 190, 913; 455/899; 700/286

(56) References Cited

U.S. PATENT DOCUMENTS 2,719,944 A 10/1955 Brailsford .................... 318/254
2,814,769 A 11/1957 Williams ..................... 318/171

(List continued on next page.)

FOREIGN PATENT DOCUMENTS

GB  1333343  10/1973  ............ B01D/3/06

OTHER PUBLICATIONS

Mehmel, C., "Modeling and Control of a Gravitational Wave Detector," IEEE International Conference on Control Applications, Trieste, Italy, Sep. 1–4, 1998, pp. 736–740.*

(List continued on next page.)

Primary Examiner—Burton Mullins
(74) Attorney, Agent, or Firm—Christie, Parker & Hale, LLP

(57) ABSTRACT

A gravitational wave generating device comprising an energizing means which act upon energizable elements such as molecules, atoms, nuclei or nuclear particles in order to create nuclear reactions or collisions, the products of which can move in a single preferred direction with an attendant impulse (jerk or harmonic oscillation) of an ensemble of target nuclei or other energizable elements over a very brief time period. The target nuclei or energizable elements acting in concert generate a gravitational wave. A preferred embodiment involves the use of a pulsed particle beam moving at the local gravitational wave speed in a target mass, which is comprised of target nuclei, to trigger a nuclear reaction and build up a coherent gravitational wave as the particles of the beam move through the target mass and impact target nuclei over very short time spans. An information-processing device connected to a computer, controls the particle beam's high-frequency, (GHz to THz) pulse rate and the number of particles in each bunch comprising the pulse in order to produce modulated gravitational waves that can carry information. A gravitational wave generation device that exhibits directivity. A gravitational wave detection device that exhibits directivity and can be tuned. The utilization of a medium in which the gravitational wave speed is reduced in order to effect refraction of the gravitational wave.

100 Claims, 13 Drawing Sheets

U.S. PATENT DOCUMENTS

| | | | | |
|---|---|---|---|---|
| 3,612,630 A | | 10/1971 | Rosensweig | 308/10 |
| 3,667,019 A | | 5/1972 | Elliott et al. | 318/254 |
| 3,903,463 A | | 9/1975 | Kanamori | 318/138 |
| 3,959,700 A | | 5/1976 | Sugiura et al. | 318/138 |
| 3,970,936 A | * | 7/1976 | Arnold | 455/899 |
| 4,035,658 A | | 7/1977 | Diggs | 290/55 |
| 4,052,134 A | | 10/1977 | Rumsey | 416/119 |
| 4,086,505 A | | 4/1978 | McDonald | 310/74 |
| 4,205,268 A | * | 5/1980 | Eerkens | 455/899 |
| 4,546,264 A | | 10/1985 | Pinson | 290/54 |
| 4,968,475 A | * | 11/1990 | Drukier et al. | 376/153 |
| 5,276,717 A | * | 1/1994 | Weber | 376/156 |
| 5,398,571 A | | 3/1995 | Lewis | 74/572 |
| 5,446,018 A | | 8/1995 | Takahata et al. | 310/90.5 |
| 5,514,923 A | | 5/1996 | Gossler et al. | 310/74 |
| 5,646,728 A | | 7/1997 | Coutsomitros | 356/352 |
| 5,721,461 A | | 2/1998 | Taylor | 310/268 |
| 5,831,362 A | | 11/1998 | Chu et al. | 310/90.5 |
| 5,929,579 A | | 7/1999 | Hsu | 318/439 |

OTHER PUBLICATIONS

Tobar, Michael, "Microwave Parametric Transducers for the Next Generation of Resonant–Mass Gravitational Wave Detectors," 1998.*

Sathyaprakash, B.S., et al. "Gravitational Waves," Europhysics News (2001), V.32, No. 6.*

Argyris, J., et al., "A Proposal of New Gravitational Experiments," Modern Physics Letters A (Dec. 28, 1997) vol. 12, No. 40, pp. 3105–3119.*

Lewis, Melvin A., "Gravitational–Wave Versus Electromagnetic–Wave Antennas," IEEE Antennas and Propagation Magazine, vol. 37, No. 3, Jun. 1995.*

Lewis, Melvin A., "Sleuthing out Gravitational Waves," IEEE Spectrum, May 1995, pp. 57–61.*

Tobar, Michael, "Characterizing multi–mode resonant–mass gravitational wave detectors," Journal of Applied Physics, V.28 (1995), pp. 1729–1736.*

Ottaway, D.J., et al., "A Compact Injection–Locked Nd: YAG Laser for Gravitational Wave Detection," IEEE Journal of Quantum Electronics, V.34, No. 10, Oct. 1998.*

Krause, J. D., "Will Gravity–Wave Communication be Possible?", IEEE Antennas and Propagation Magazine, vol. 33, No. 4, Aug. 1991, pp. 21–23.

J. Weber, "Gravitational Waves" in *Gravitation and Relativity*, Chapter 5, pp. 90–105 (W.A. Benjamin, Inc., New York, 1964).

J. Weber, "Detection and Generation of Gravitational Waves", *Physical Review*, (1960) vol. 117, No. 1, pp. 306–313.

J. Weber, "Gravitational Radiation from the Pulsars", *Physical Review Letters*(1968) vol. 21, No. 6, pp. 395–396.

Robert L. Forward and Larry R. Miller "Generation and Detection of Dynamic Gravitational–Gradient Fields", Hughes Research Laboratories, Aug. 5, 1966, pp. 512–518.

Gertsenshtein, M.E., "Wave Resonance of Light and Gravitational Waves" (1962), Soviet Physics JETP, vol. 14, No. 1, pp. 84–85.

Einstein, et al., "On Gravitational Waves", Jan. 1937, pp. 43–54, vol. 223, 1333–4.

Brustein, et al., "Relic gravitational waves from string cosmology", Physics Letters, Nov., 1995, pp. 45–51, B 361, Elsevier Science B.V.

Vallisneri, "Prospects for Gravitational–Wave Observations of Neutron–Star Tidal Disruption in Neutron–Star–Black–Hole Binaries", Physical Review Letters, Apr. 17, 2000, pp. 3519–3522, vol. 84, No. 16, The American Physical Society.

Flanagan, "Measuring gravitational waves from binary black hole coalescences. I. Signal to noise for inspiral, merger, and ringdown", Physical Review D, Apr. 2, 1998, pp. 4535–4565, vol. 57, No. 8, The American Physical Society.

Pegoraro, et al., "Electromagnetic Detector for Gravitational Waves", Physics Letters, Oct. 2, 1978, pp 165–168, vol. 68A, No. 2.

Tokuoka, "Interaction of Electromagnetic and Gravitational Waves in the Weak and Short Wave Limit", Nov. 1975, pp. 1309–1317, vol. 54, No. 5, Progress of Theorectical Physics.

Chakrabarty, "Gravitational Waves: An Introduction", Physics/9908041, Aug. 21, 1999, pp. 1–22, Mehta Research Institute, India.

Landau, et al., "The Classical Theory of Fields", 1975, pp. Cover, bibliography, 345–357, Fourth Revised English Edition, Pergamon Press.

Baker, "Astrodynamics, Applications and Advanced Topics", Academic Press, 1967 pp. 376–393.

Portilla, et al., "Generation of High Frequency Gravitational Waves", Department d'Astronomia i Astrofiscia, c/Dr. Moliner 50, 46100 Burjassot, Valencia, Spain, 2001, The American Physical Society, pp. 63 044014–1to 044014–7.

Grishchuk, et al., "Emission of gravitational waves by an electromagnetic cavity", Feb. 1974, pp. 215–221, vol. 38, No. 2, Sov. Phys.–JETP.

Braginskii, et al., "Electromagnetic detectors of gravitational waves", May 1974, pp. 865–869, vol. 38, No. 5, Sov. Phys.–JETP.

Baker, "Preliminary Tests of Fundamental Concepts Associated with Gravitational–Wave Spacecraft Propulsion", AIAA Space 2000 Conference & Exposition, Sep. 20, 2000, pp. 1–26 and pp. 1–5A (Addendum), Paper No. 2000–5250, American Institute of Aeronautics and Astronautics, Inc.

* cited by examiner

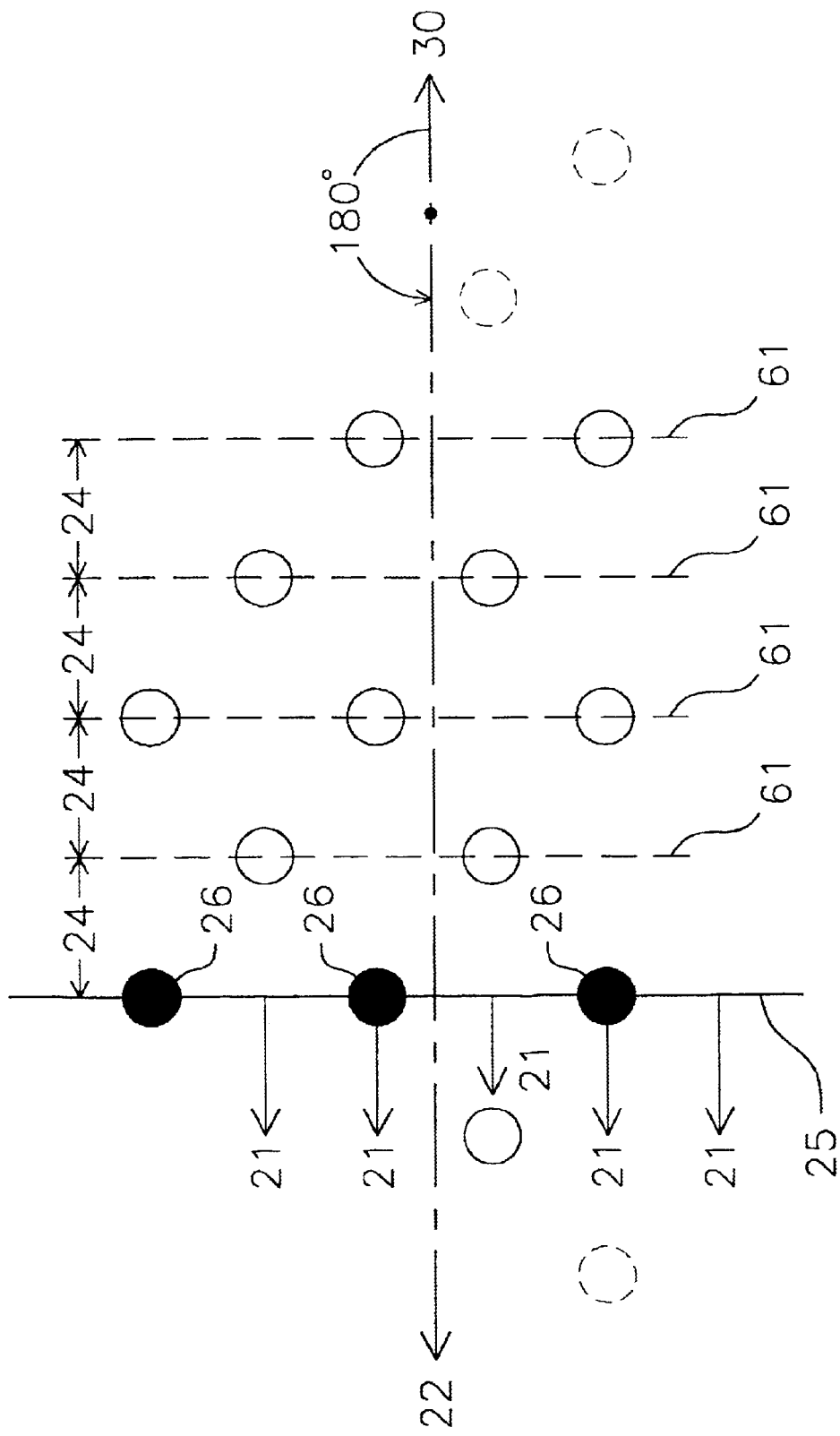

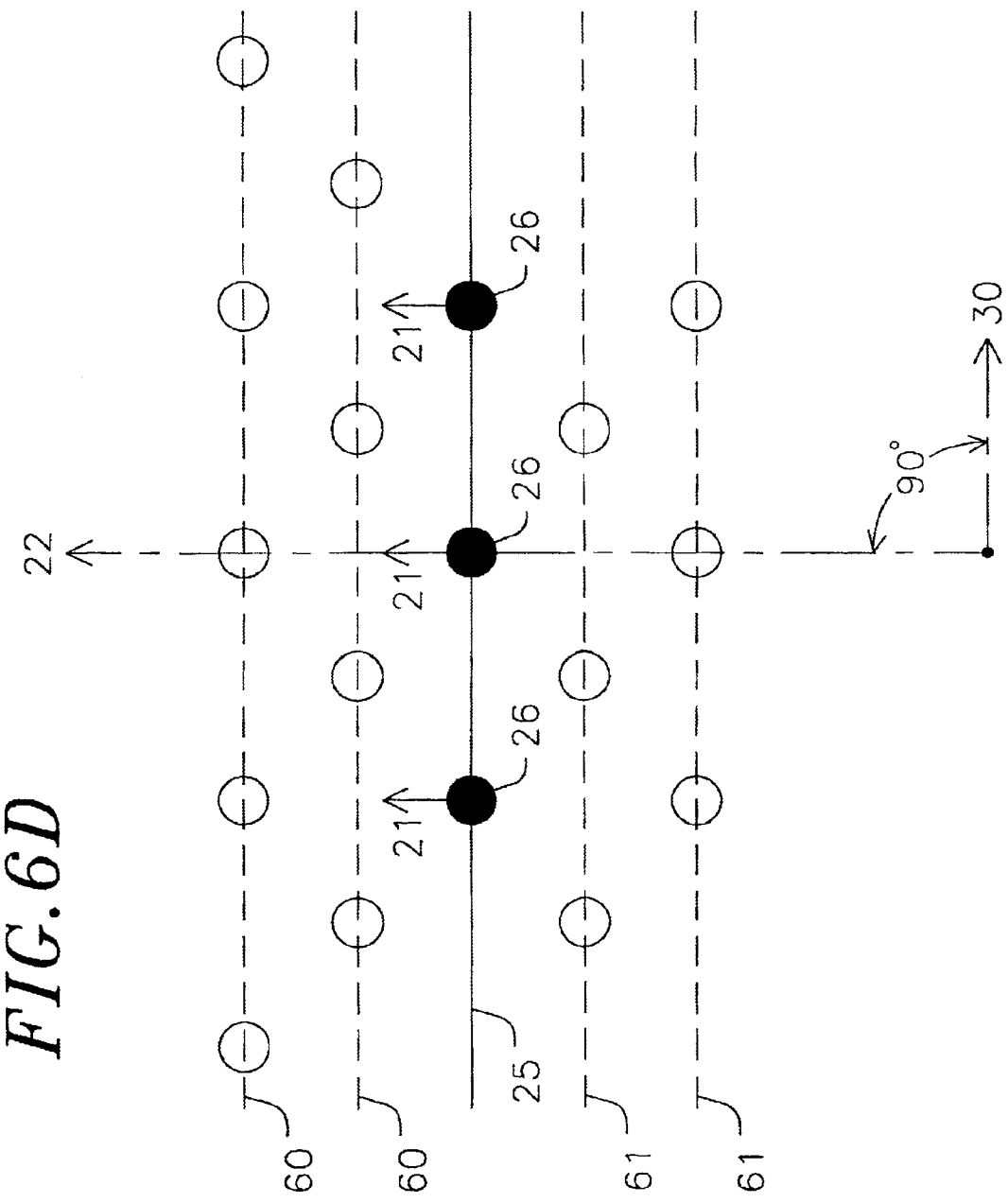

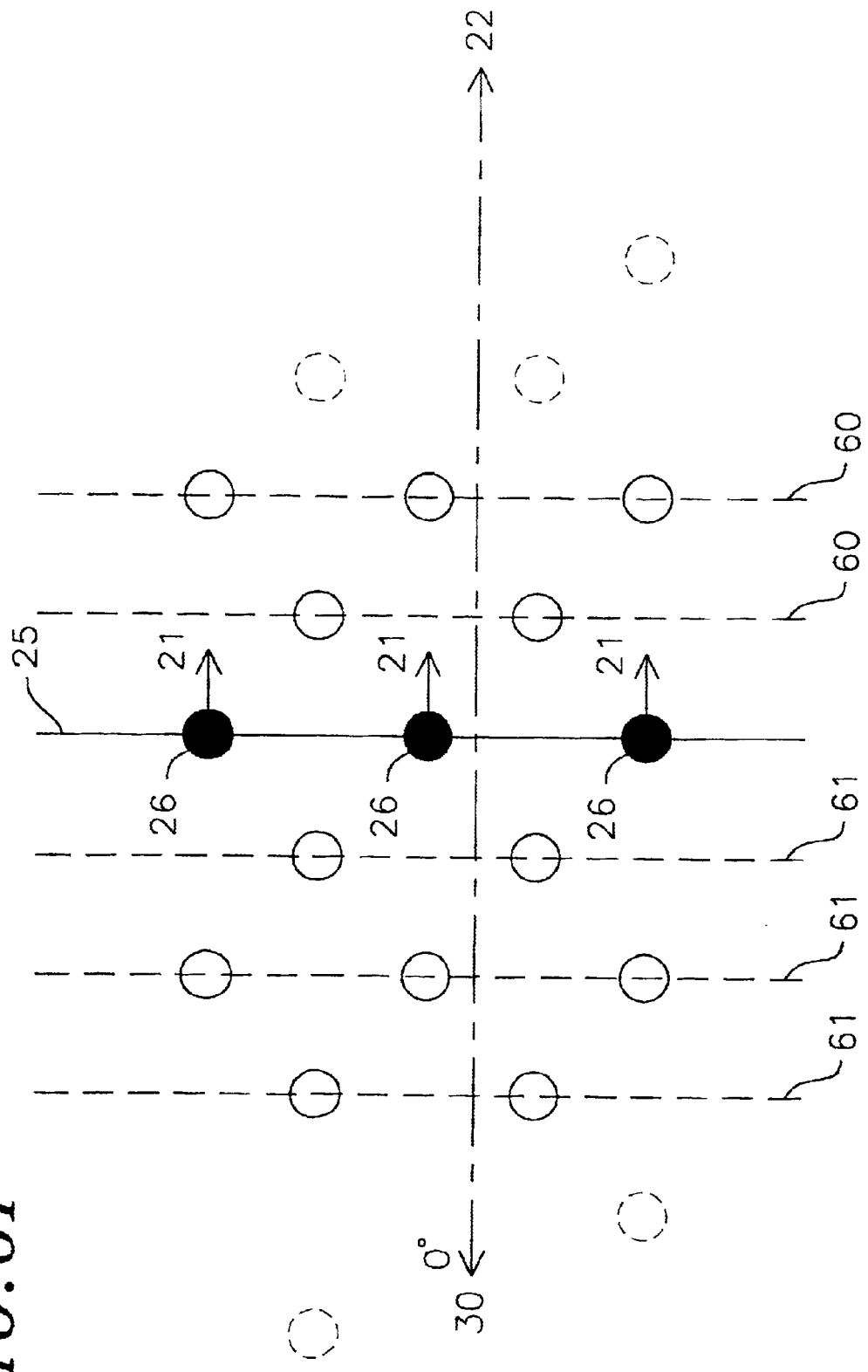

GRAVITATIONAL WAVE GENERATOR UTILIZING SUBMICROSCOPIC ENERGIZABLE ELEMENTS

REFERENCE TO RELATED APPLICATIONS

This application is a continuation-in-part of application Ser. No. 09/616,683, filed Jul. 14, 2000, now U.S. Pat. No. 6,417,597, Jul. 9, 2002, which is a continuation-in-part of Ser. No. 09/443,257, filed Nov. 19. 1999, now U.S. Pat. No. 6,160,336, Dec. 12, 2000.

BACKGROUND OF THE INVENTION

This invention relates to the generation, refraction and detection of high-frequency gravitational waves that can be modulated and utilized for communications, propulsion and for the purpose of testing new physical and astronomical theories, concepts, and conjectures. More particularly the invention relates to the generation of gravitational waves (GW) by the interaction of submicroscopic energizing and energizable elements (molecules, atoms, nuclei, nuclear particles, electrons, photons, antiprotons, etc.). The invention also relates to the use of forces such as electromagnetic or nuclear to impart a third-time derivative or oscillatory motion to a mass consisting of a collection of submasses or mass-pairs of energizable elements such as target nuclei.

The nuclear forces, which are approximately one-hundred times stronger than electromagnetic forces, are occasioned by the interaction of an energizing mechanism such as a submicroscopic particle beam with a collection of energizable elements such as target nuclei, which can be aligned with each other, or with another particle beam whose particles can also be aligned. Upon interaction with the particle beam or some other energizing mechanism, some of the nuclei are triggered by the impacting particles to produce a nuclear reaction thereby generating an impulse, that is, undergo a reactive jerk or a harmonic oscillation. The resulting reactive jerk or harmonic oscillation of the ensemble of target nuclei or other energizable elements acting in concert in turn generates a gravitational wave (GW).

The general concept of the present invention is to simulate or emulate GW generated by energizable cel stial systems (rotating binary stars, star explosions, collapse to black holes, etc) by the use of micro, terrestrial energizable systems. Such terrestrial systems generate well over 40 orders of magnitude more force intensity (nuclear or electromagnetic compared to gravitational) and well over 12 orders of magnitude greater frequency (THz compared to 1 Hz or a small fraction of 1 Hz) than the celestial systems. Terrestrial energizable systems produce significant and useful GW according to the various embodiments of the present invention, even though they are orders of magnitude smaller than extra-terrestrial, celestial systems. In the various embodiments of the present invention the large number of small energizable elements are energized in a sequence or in concert by energizing elements emulating the motion of a much larger and extended body having a larger radius of gyration in order to enhance the generation of GW. The laboratory generation of GW was discussed by Pinto & Rotoli in *General Relativity and Gravitational Physics*, 1998, World Scientific, Singapore. They found (page 560) terrestrial laboratory GW generation to be " . . . at the limit of the state of the art . . . ", but they did not consider submicroscopic, specifically nuclear particles and associated forces and did not discuss the jerk mechanism for generating GW or computer control.

Description of Prior Art

Robert M. L. Baker, Jr. in application Ser. No. 09/616,683, filed Jul. 14, 2000, entitled Gravitational Wave Generator, now U.S. Pat. No. 6,417,597, teaches that a third time derivative or jerk of a mass generates gravitational waves (GW) or produces a quadrupole moment and that the GW energy radiates along the axis of the jerk or if a harmonic oscillation, then radiates in a plane normal to the axis of the oscillation. The force producing such a jerk or oscillation can be gravitational attraction, centrifugal, electromagnetic, nuclear, or, in fact, any force. The magnitude of the jerk or, more specifically, the magnitude of the third time derivative of the moment of inertia of the mass squared, determines the magnitude of the generated GW determined, for example by a quadruple approximation. This latter quantity is approximately equal to the product of a very small coefficient and the square of a kernel or fraction consisting of twice the radius of gyration of the mass times the change in force divided by the time interval required to create the force change. The force energizing mechanism can be a particle beam. The particle-beam frequency is that resulting from chopping the particle beam into bunches. The magnitude of the GW power is approximately proportional to the square of the kernel according to the general theory of relativity as discussed in the Baker patent application Ser. No. 09/616,683, filed Jul. 14, 2000, now U.S. Pat. No. 6,417,597. Transmission of modulated GW and subsequent detection enable use of GW in communications applications.

A preferred embodiment of the invention relies on the use of aligned target nuclei wherein the nuclear reaction attendant upon the collision of the particle-beam particles with the nuclei releases its products in a preferred direction in space so that all target nuclei act in concert to produce a jerk or harmonic oscillation of the target mass and accumulatively generate a GW. Thus related to the GW generation process, but not the process itself, is the containment system to produce nuclei alignment. That system and process is described in three patents by Henry William Wallace, U.S. Pat. Nos. 3,626,605, 3,626,606, and 3,823,570 and incorporated herein by reference. Applicable to the GW communications applications is the ability to measure small voltages and currents by a superconducting quantum interference device or SQUID, that is described, for example, by Michael B. Simmonds in U.S. Pat. No. 4,403,189 and incorporated herein by reference. Another useful technique, termed quantum non-demolition, or QND, is also applicable to the GW communications applications and is described by Harry J. Kimble, et al. in U.S. Pat. No. 4,944,592 and incorporated herein by reference. QND facilitates the communication application by avoiding quantum mechanical difficulties.

SUMMARY OF THE INVENTION

The present invention provides the generation of gravitational waves (GW) caused by the interaction of submicroscopic (molecules, atoms, nuclei, nuclear particles, electrons, photons, etc.) energizing and energizable elements. This interaction involves electromagnetic forces or nuclear forces. The important feature of the interaction is that the inertial mass of the energizable elements, taken as a whole, is caused to jerk or harmonically oscillate and thereby generate GW. A presently preferred embodiment of the present invention utilizes strong nuclear forces that are attendant to a nuclear reaction triggered or energized by the impact of a submicroscopic energizing particle, such as a photon, electron, proton, neutron, antiproton, alpha particle, etc. from a high-frequency pulsed particle beam incident on a target mass composed of energizable elements such as atomic nuclei. In the preferred embodiment, the nuclei are aligned or constrained as to spin or some other nuclear condition by being placed in an electromagnetic field, in a superconducting state, spin polarized, etc. This results in the products of all of the nuclear reactions being emitted in approximately the same preferred direction. Each emission results in a recoil impulse on the nuclei or a rapid build up of force that jerks the nuclei or causes them to harmonically oscillate and results in an emission of gravitational waves or wave/particles also called "gravitational instantons." The particles in the beam are chopped into very small bunches, that is, with, for example, GHz to THz frequency, so that a very rapid force build up or jerk is produced in the target mass, that is, in the target nuclei, resulting in a GW exhibiting the chopping frequency. The impulse can also be accomplished without nuclei alignment by other means, such as molecular or high-energy nuclear beam particle collision with unaligned target nuclei or by impressing a high-frequency magnetic field on a high-temperature superconductor. Since gravitational waves in, for example, a superconductor move significantly slower than light speed, the particles of the beam can be accelerated to this GW speed and move through the ensemble of target nuclei, which compose the target mass, in step with the forward-moving or radially-moving gravitational wave. Thus, the forward-moving or radially-moving gravitational wave (GW) builds up amplitude as the particles of the beam move through the target particles in concert to generate coherent GW and emulate a much larger target mass. By varying the number of particles in each bunch of particles in the particle beam and the chopping frequency, both the beam and the gravitational waves produced by it can be modulated and carry information. The target mass or collection of target nuclei can be a solid, a liquid (including a superfluid such as liquid helium II), a gas (including an electron gas) or other particle collection.

BRIEF DESCRIPTION OF THE DRAWINGS

FIG. 6B is a diagram of an array of energizable elements, members of which 26 are energized as the crest or front of a GW 25 passes by resulting in a reinforced GW having a directivity angle of 180°.

FIG. 6D is a diagram of the array of FIG. 6B with a directivity angle is 90°.

FIG. 6F is a diagram of the array of FIG. 6B with a directivity angle is 0°.

DETAILED DESCRIPTION OP THE INVENTION

Figure 1:
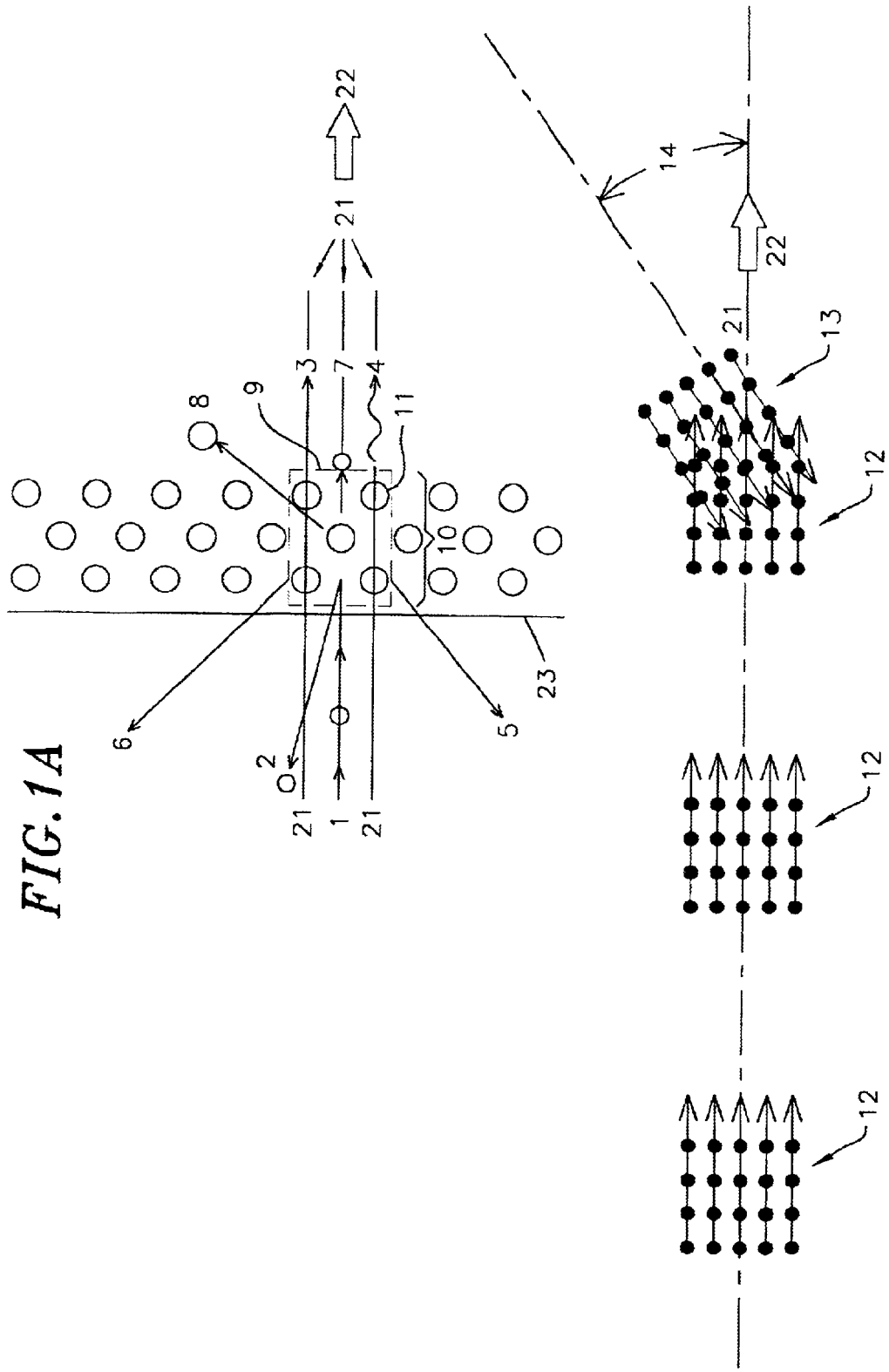
FIG. 1A is a diagram of the impact of a particle beam 1 with a target mass 9 resulting in the generation of gravitational waves having axis 21.
FIG. 1B is a diagram of bunches of particles 12 in a particle beam interacting with another incoming particle bunch 13 resulting in the generation of gravitational waves having an axis 21.

In FIG. 1A, in the preferred embodiment, an incoming particle beam 1 impacts a target mass 9 through its containment surface 23 resulting in a nuclear reaction or collision and the generation of GW exhibiting an axis 21, which can propagate radially or in either direction. The reaction or collision also produces back scattered particles 2, nuclear reaction products 3 moving in the preferred direction of target nuclei alignment 22, high-energy photons 4 (for example, x-ray emissions) also moving primarily in the preferred direction 22, sputtered particles 7, and recoil atoms 8. A typical target atom 11 when impacted by the particle beam is jerked by the release of nuclear-reaction products or by collision or by other means and produce GW similar to or in simulation of a sub-microscopic star explosion or collapse discussed by Geoff Burdge, Deputy Director for Technology and Systems of the National Security Agency, written communication dated Jan. 19, 2000 and incorporated herein by reference. This axis is described and illustrated co-pending patent application, Ser. No. 09/616,683, filed Jul. 14, 2000, now U.S. Pat. No. 6,417,597. In the case of nuclear-reaction-produced jerks, the radius of gyration at the reactants is significantly smaller than the GW wavelength so that the quadrupole approximation holds. The energizing process can also result in harmonic oscillation or a quadrupole radiator. In this case the GW propagates radially or cylindrically as discussed by Albert Einstein and Nathan Rosen (1937, Journal of the Franklin Institute, 223, pp. 43–54). The target's characteristic length, absorption depth, or approximate radius of gyration of the extensive emulated target mass 10 is utilized in the quadrupole approximation to compute the power of the GW that is generated.

In FIG. 1B, the particle bunches 12 are shown impacting or colliding with an incoming particle bunch 13 of another particle beam at a collision angle 14, which could be any value including zero. In this case, the incoming target bunch is contemplated to be spin-polarized noble gas, such as helium II or odd-nuclear isotopes of xenon, etc. in order to exhibit a preferred direction in space 22.

Figure 2:
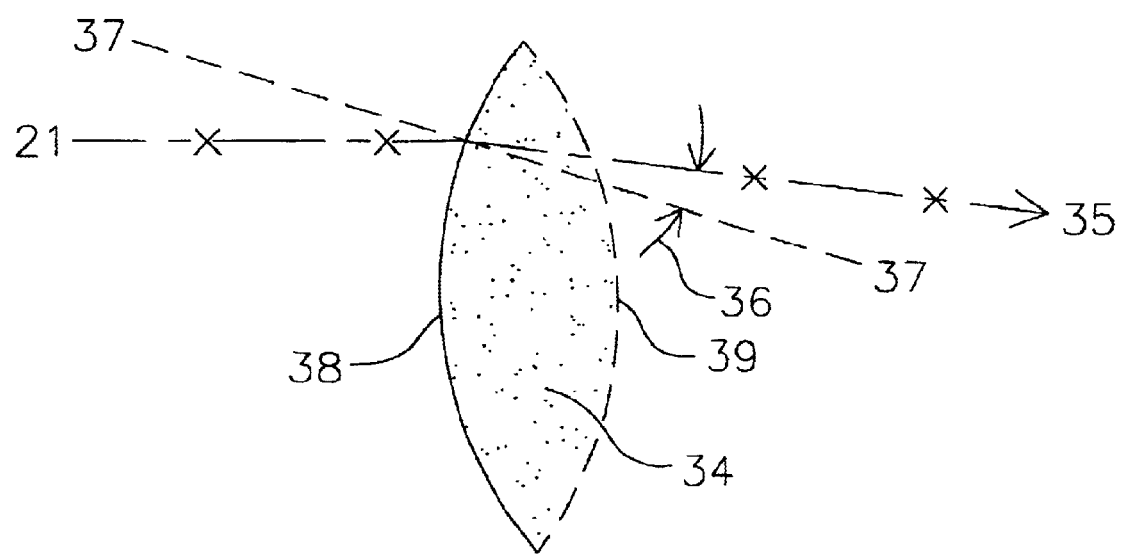
FIG. 2 is a diagram of GW 21, passing through a medium that refract GW 34 and causes the GW to bend 35 as it traverses the surface of the medium 38 and can be focused.

In FIG. 2 is exhibited a medium in which the GW speed is reduced 34, the new direction of GW 35 caused by the GW passing through a boundary of a medium 38 at an oblique angle 36 with respect to a normal to the surface of such a medium 37 produces GW refraction. The back surface of the medium in which the GW speed is again changed 39 is shown, but for clarity no refractive bending of the GW is exhibited. Examples of suitable media are superconducting media.

Figure 3A:
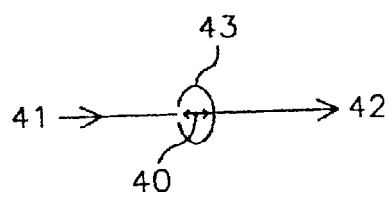
FIG. 3A is a diagram of an energizing particle 41 impacting an energizable particle 40 resulting in the generation of a cylindrical GW or GW ring 43.

In FIGS. 3A, 3B, 3C, and 3D are exhibited the build up or accumulation of GW along the radially expanding cylindrical GW wave fronts created by and normal to the motion direction 42 of the energizable particle or quadrupole radiator axis. In FIG. 3A a typical central target-mass particle 40 is energized by an incoming particle 41 of the particle-beam bunch. The radially expanding GW wave front 43 moves out at local GW speed.

Figure 3B:
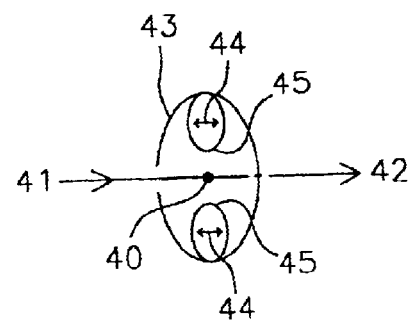
FIG. 3B is a diagram of a subsequent impact with other particles 44 resulting in GW 45 that reinforces the GW 43.

In FIG. 3B, which is at a time $\Delta t$ later, where $\Delta t$ is the time between the arrival of the first and second particle bunch, that is, inversely proportional to the beam-chopping frequency. In this case GW 43 emanating from the first typical target-mass particle 40 is reinforced or constructively interferes with the GW generated by other target-mass particles 44 situated at the distance VGW$\Delta t$ radially out from target-mass particle 40, where VGW is the local GW speed. For clarity only two particles 44 are exhibited out of a ring of such target particles in the target mass in a plane normal to the direction of the energizing motion. Their location will be such as to cause their GW 45 to constructively interfere with and reinforce the originally expanding GW 43.

Figure 3C:
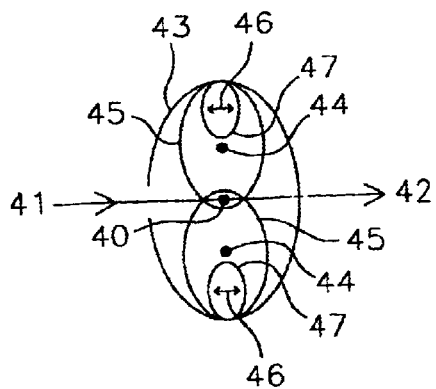
FIG. 3C is a diagram of another subsequent impact with other particles 46 resulting in GW 47 that reinforces the GW 43 and 45.
Figure 3D:
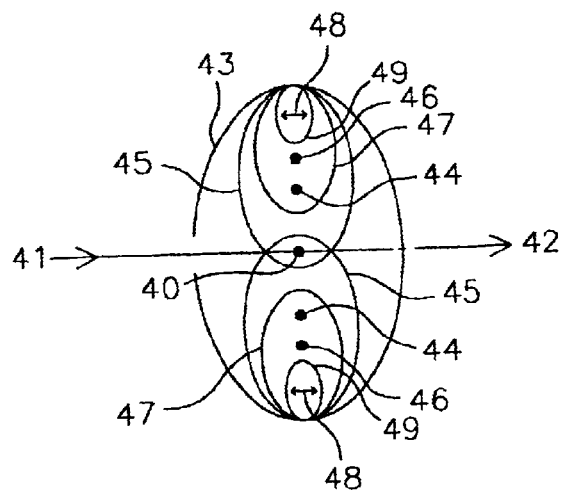
FIG. 3D is a diagram of yet another subsequent impact with other particles 48 resulting in GW 49 that reinforces the GW 43, 45, and 47.

In FIG. 3C, which is at time $2\Delta t$ later, the GW 43 emanating from the first particle 40 and the second particles 44 are reinforced by another set of particles 46 and their attendant GW 47. FIG. 3D is at time $3\Delta t$ and typical target-mass particles 48 add their GW 49 to the accumulating and radially expanding GW. Each arriving beam bunch initiates additional expanding rings of coherent GW until the target-mass particles are exhausted or until their replacements are unavailable. There are large numbers of energizable particle sites that are simultaneously energized so that the GW permeates the target mass as the GW are superimposed. As noted by Pinto & Rotoli (op cit, p. 567) " ... the quadrupole formula is only valid provided a suitable surface integral vanish(es), which is the case for an assembly of point sources, ... ".

In the context of the previous application, Ser. No. 09/616,683, now U.S. Pat. No. 6,417,597, the typical target-mass, particles such as 40, 44, 46, and 48 are considered to be energizable elements. Such elements can be permanent magnets, electromagnets, solenoids (or nanosolenoids) current-carrying plates, piezoelectric crystals, nanomachines including harmonic oscillators, nanomotors and nanoselenoids or microelectromechanical systems (MEMS) and nanoelectromechanical systems (NEMS) in general, etc. In the case of solenoids (or nanosolenoids), some nanomachines, nanoelectromechanical systems, current-carrying plates, etc. the energizing and enegizable elements can be colocated, for example the energizing coil around the energizable central magnetic core in the case of the nanosolenoids.

The energizing elements in the context of the '683 application would include coils, current pulses moving in conductors, biomolecular motors, etc. that operate under the control of an Individual Independently Programmable Coil System (IIPCS), described in the parent U.S. Pat. No. 6,160,336 of which the previous Application, now U.S. Pat. No. 6,417,597, is a continuation-in-part, in order to activate or energize the energizable elements in a sequence as the ring of GW, whose propagation plane is normal to the direction of the energizable elements quadrupole radiator axis, moves radially out at local GW speed. In this case directivity can be achieved in both l:he orientation of the GW ring's plane, the sector of that expanding ring where the GW wave front is reinforced or constructively interfered with by energizing the energizable elements and/or by destructive interference of one GW with another (as in the astrophysical case of a uniformly, isotropically exploding or collapsing star). The collector elements, in the context of the previous application, Ser. No. 09/611,683, now U.S. Pat. No. 6,417,597 would be at the same locations as the energizable elements and interrogated in a sequence by the IIPCS to detect or receive specific GW frequencies, that is, tuned to the GW frequency.

Figure 4:
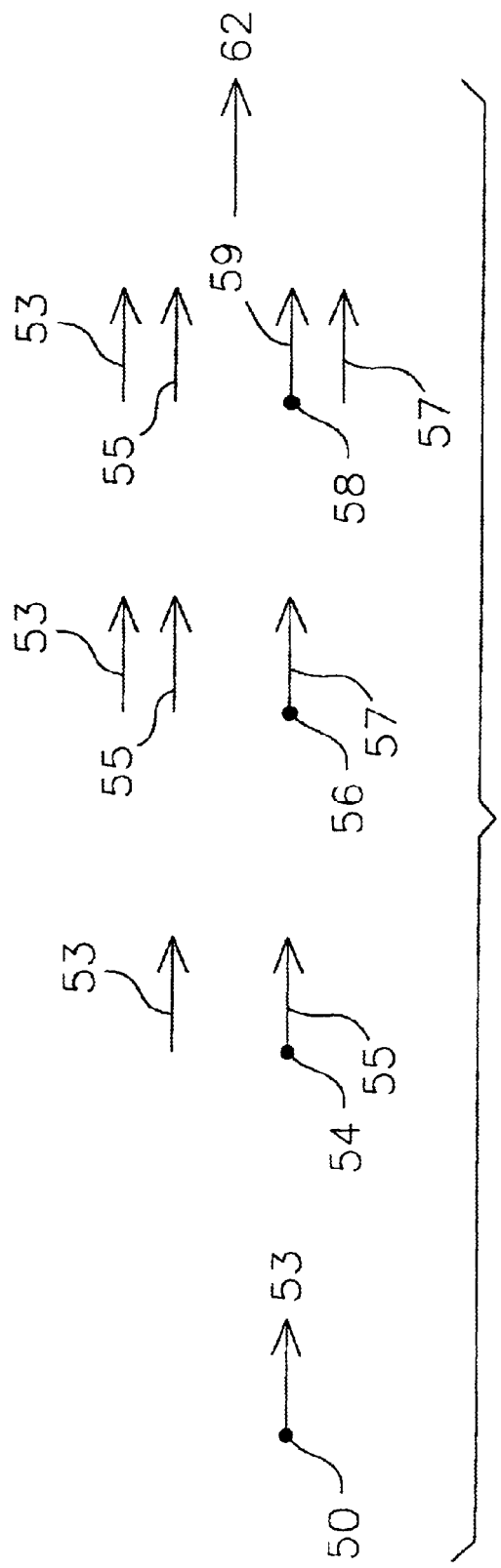
FIG. 4 is a diagram of energizable particles 50, 54, 56 and 58 releasing linear or plane-wave GW 53, 55, 57, and 59 that result in a build up or reinforcement of GW 62.

In FIG. 4 the constructive interference or reinforcement or amplification of a GW by energizable elements is over a linear pattern 50, 54, 56, and 58 produced by a micro mass explosion or collapse which simulate a macro star explosion or collapse, with GW directed along its axis as predicted by Burdge, op. cit. 2000 is illustrated (but directed in both directions along the axis. The reinforcement of GW is illustrated schematically by the arrows 53, 55, 57, and 59. The GW builds up to a larger amplitude 62 as the beam bunch and the GW crest or front move with the same speed together through the particles comprising the target mass and generate coherent GW pulses. The target particles or energizable elements 50, 54, 56 and 58 are VGW $\Delta t$ apart where VGW is the GW speed and $\Delta t$ is the time between energization. Thus an extensive mass composed of all of the energized target particles is emulated. In the context of the '597 patent the typical target mass particles 50, 54, 56 and 58 are considered to be energizable elements. As already discussed, such elements can be magnets, conductors, piezoelectric crystals, harmonic oscillators, nanomachines, etc. The collector elements, in the context of '597, would be at the same locations as the energizable elements and interrogated in a sequence by the IIPCS to detect or receive GW having a particular frequency and phase.

Figure 5:
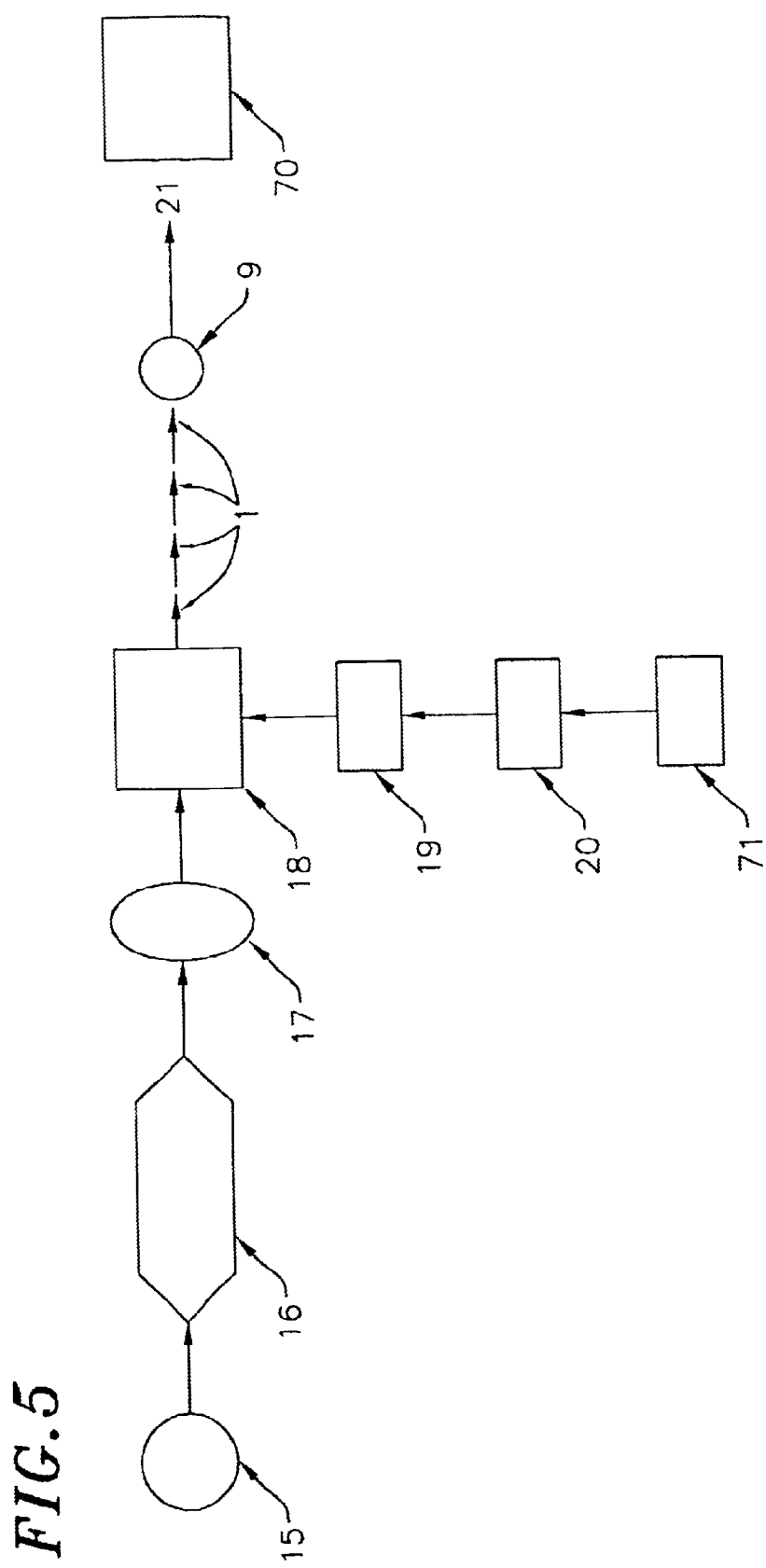
FIG. 5 is a diagram of a particle source 15 that can be accelerated by an acceleration device 16, focused by a focusing device 17 and separated into bunches by a chopping device 18. The chopping device is controlled by a computer 19, an information-processing device 20, and a transmitting device 71. The particle bunches 1 energize target particles 9 and result in GW having axis 21 and capable of being received by a receiving device 70.

In FIG. 5, of the preferred embodiment a particle source 15, which could be a laser or a nuclear reaction, produces particles that can be accelerated by an acceleration device 16 (unless the particles are photons), focused by a focusing device 17 such as a superconducting medium or electromagnetic field and separated into bunches by a beam chopper 18. The target mass can be a solid, a liquid (including a superfluid such as liquid helium II), a gas (including electron gas), or another particle beam. Alternately, the beam can be separated into bunches and modulated as to frequency and number of particles in each bunch at the particle source 15. The particle source 15 or beam chopper 18 is controlled by computer 19, an information-processing device 20 and transmitter 71. The particle beam bunches 1 impact the target particles 9 and produce a nuclear reaction, generating GW 21, which can be received at receiving device 70. The information processing device 20 can be, for example, a Kalman filter and/or a table look up for identifying the element to be energized.

Figure 6A:
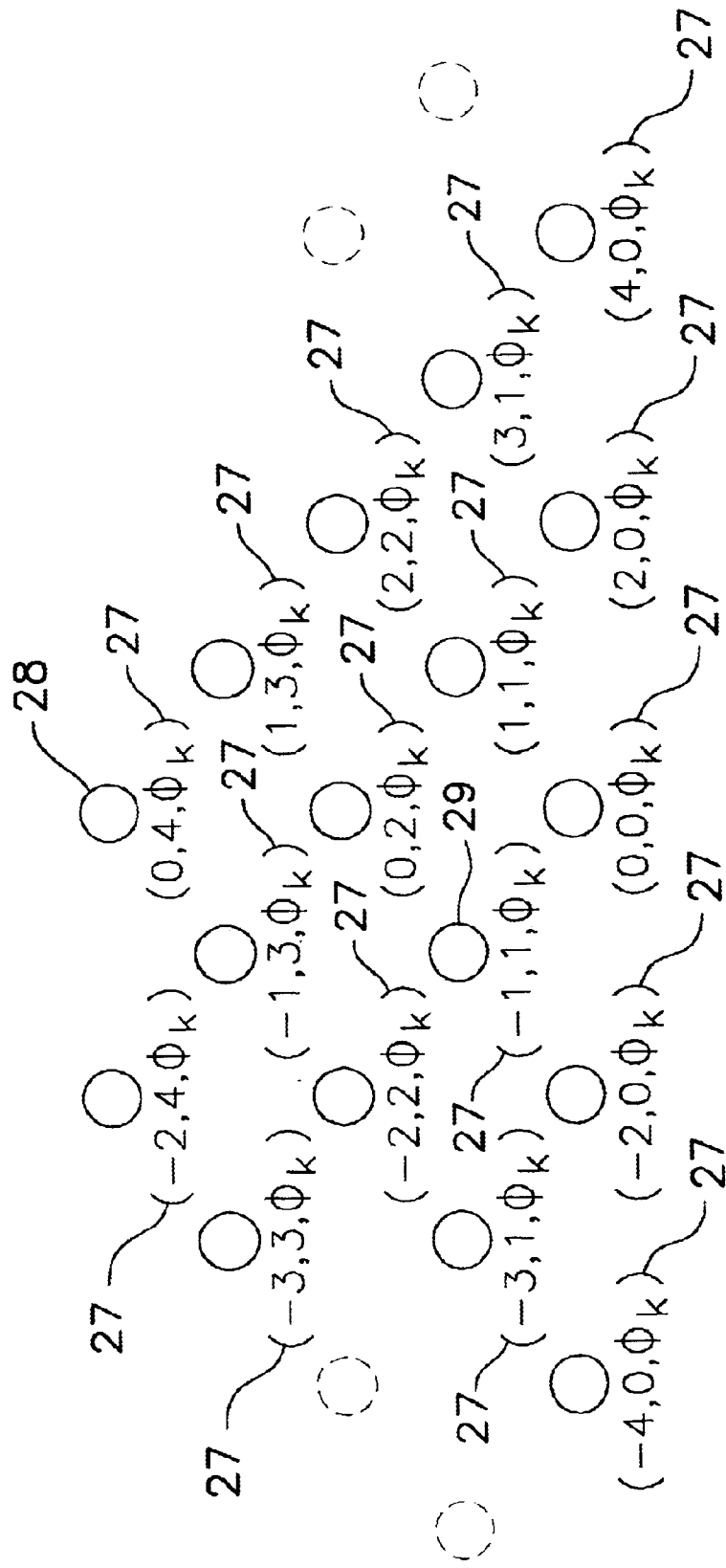
FIG. 6A is a plan view of an array of energizable elements such as 28 whose relative location is denoted by 27.

In FIG. 6A, are illustrated a plan view of a typical stack of elements or array of element sets or subsets, which could be GW collectors or could be energizable elements such as target atoms or nuclei. The indices, which describe the location or address of these elements, 27 are denoted by i, j, φk. For example, the top element 28 has an index i=0 (0th column), j=4 (4th row), and φk represents the directivity of this individual element, either produced by an active element or element set alignment or by connecting a specific, kth member of an underlying stack of elements, having the appropriate orientation fixed, of which the figure shows only the top member. As another example element 29 has an index i-1 (-1st column), j=1 (1st row), and φk.

Figure 6C:
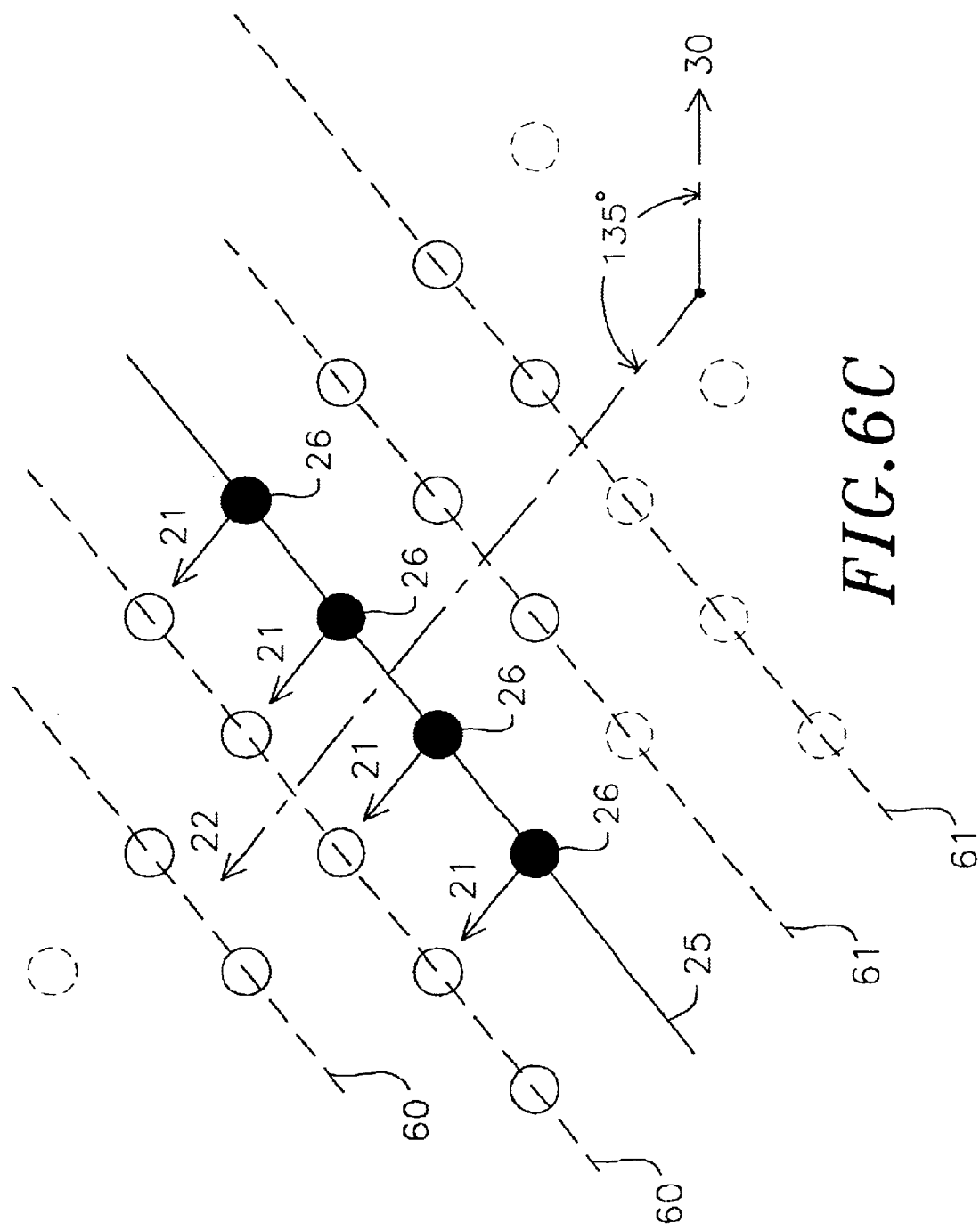
FIG. 6C is a diagram of the array of FIG. 6B with a directivity angle is 135°.

In FIG. 6B the directivity angle to the preferred direction 22 is 180° and the prior locations of the GW crests 61 are behind the GW crest 25. The distance between the lines (or planes comprising the GW wave crests) at elements in the GW direction 21 is 24. The elements 26 on the;anticipated GW crest 25 of the GW 21 are connected to an information processing device, that is interrogated (detection mode) or energized (generation mode). In FIG. 6C the future locations of the GW crests 60 is in front of the GW crest 25 and the directivity angle is 135°, in FIG. 6D it is 90°, in FIG. 6E it is 45° and in FIG. 6F it is 0°.

Figure 7:
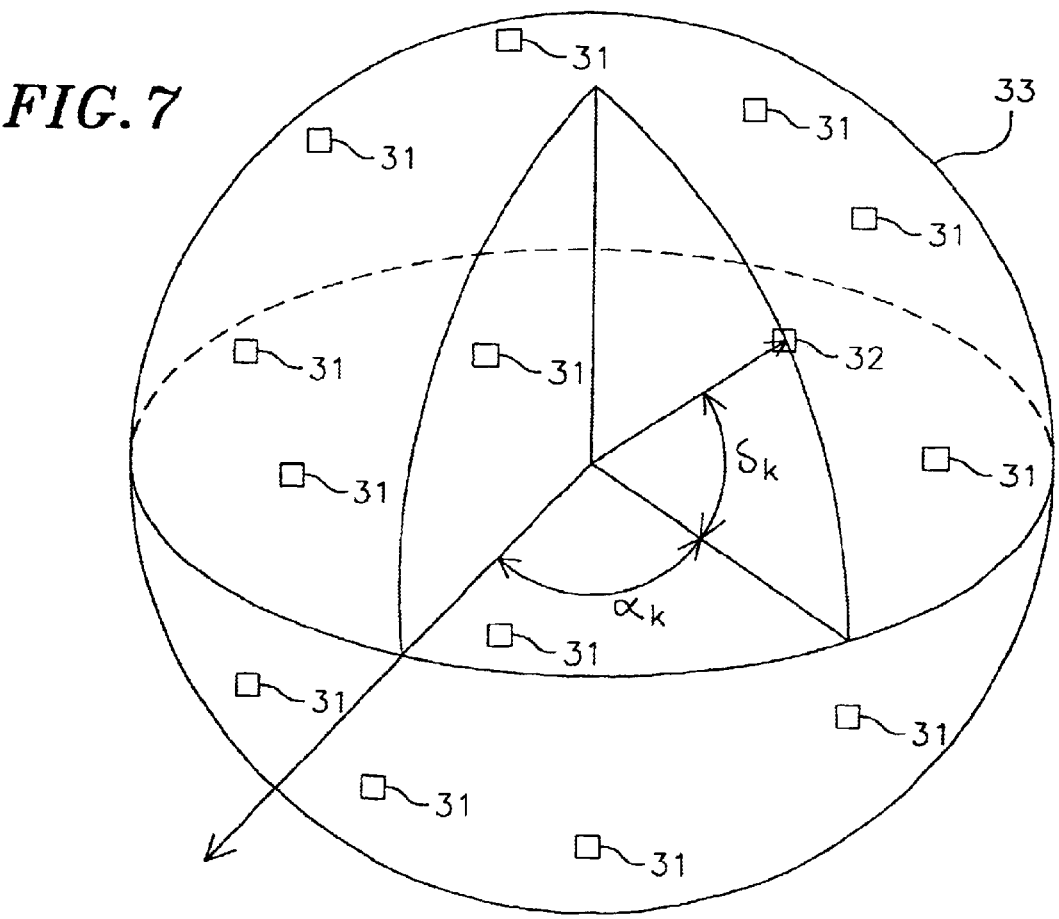
FIG. 7 is a diagram of various elements 31 that are spread out over a sphere 33 that results in either the generation or detection of GW with directivity.

In FIG. 7 is illustrated a spherical set of element sets or subsets or electrodes 31 comprising an element having directivity angles αk and δk for a kth member of the element set or subset 32 distributed over a sphere 33.

Figure 8:
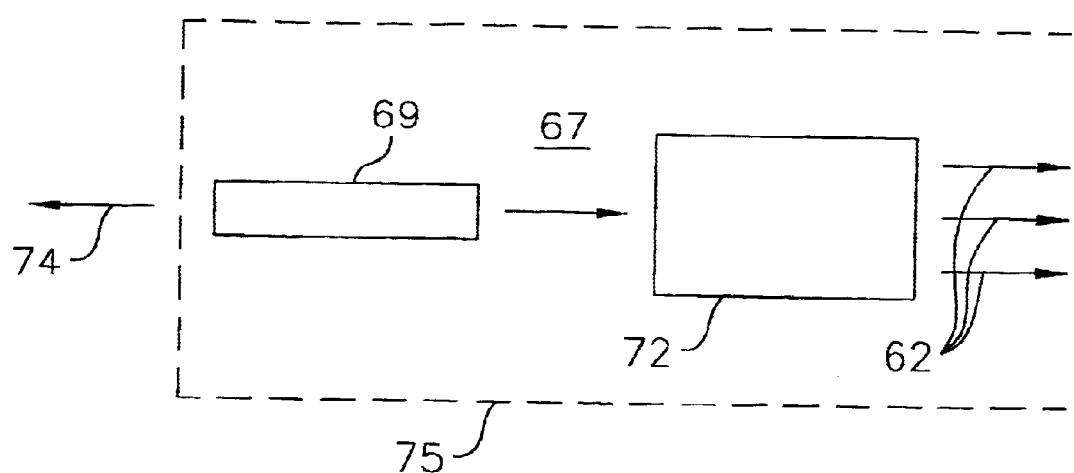
FIG. 8 is a block diagram of a propulsion system utilizing a gravitational wave generator according to the present invention.

A propulsion system utilizing a gravitational wave generator is shown in block diagram form in FIG. 8. As shown therein, the propulsion system provides a gravitational wave generator 67 disposed within a vehicle housing 75. The generator includes a particle-beam source 69 energizing elements and nuclear-reaction chamber 72, which includes the target-mass energizable elements. Such elements could involve high-energy, nuclear-particle collisions whose products are distribut d asymmetrical in the direction of tab particle-beam energizing element's motion (as discussed by Charles Seife (2000), Science, Volume 291, Number 5504, p. 573 and incorporated herein by reference). Alternatively, the energizable nuclear elements could be constrained to a preferred orientation yielding a preferred direction of the collision products and again, a nuclear jerk in a preferred direction. Such GW directivity is illustrated schematically in FIGS. 8A and 8B of the parent patent, U.S. Pat. No. 6,160,336. The rearward moving gravitational waves 62 exit the rear of the vehicle propelling the vehicle in the desired direction of travel 74. The target-mass energizable elements in the nuclear-reaction chamber 72 build up, by constructive interference or reinforcement, the coherent GW 62 as exhibited in FIG. 4. The system of energizable elements comprising the target emulates a more extensive mass having a longer effective radius of gyration 10 exhibited in FIG. 1A and, therefore, stronger GW and more momentum to cause the forward motion in the desired direction of travel 74. A refractive medium can intercept the oppositely or forward-directed GW and those rays can be bent or refracted to the side in order to reduce the forward component of GW momentum and, thereby promote forward propulsion in the desired direction of travel. The forward-moving portion of the GW generated by the jerks associated with the energization of the elements comprising the target mass is not coherent. This GW portion is the result of the smaller actual radii of gyration of each individual energizable element. Thus weaker GW is generated and as previously mentioned, can be bent to the side by a GW refractive medium and far less momentum is carried away to counter the propulsion in the desired forward direction of travel so that forward propulsion dominates.

The present invention relies upon the fact that the rapid movement or jerk or oscillation of a mass or collection of submicroscopic particles such as nuclei will produce a quadrupole moment and generate useful high-frequency, for example, up to QuadraHertz (Qhz) or higher-frequency, GW. The device described herein accomplishes GW generation in several ways based upon the interaction of energizing and energizable submicroscopic particles.

In a preferred embodiment a collection of target nuclei or target-beam particles are jerked or otherwise set in motion, for example, harmonic oscillatory motion, in concert, in response to the impact of a particle beam, which is a directed flow of particles or waves that carries energy and information. The particle beam moves with the same speed as the local speed of the gravitational waves. According to Ning Li and Douglas Torr (1992), Physical Review B, Volume 64, Number 9, p.5491, if the target is a superconductor, then the GW are estimated to be two orders of magnitude slower than the speed of GW in a vacuum or the speed of light. Specifically, they state: "It should be pointed out that since nothing is known of the phase velocity of a gravitational wave . . . propagating within a superconductor, it is usually presumed to be equal to the velocity of light. We argue that the interaction of the coupled electromagnetic and gravito-electromagnetic fields with the Coop r pairs in superconductors will form a superconducting condensate wave characterized by a phase velocity $vp_\eta^-$. Since . . . the phase velocity can be predicted for the first time as $$vp_\eta^- m \ldots 10^6 \, [m/s] \tag{30}$$

which is two orders of magnitude smaller than the velocity of light."

The target will exhibit an absorption thickness, that is, a length over which many of the impacting particles interact with the target nuclei to produce a nuclear reaction whose collision products move in a preferred direction resulting in a jerk or oscillation.

The particle beam is composed of bunches of particles generated in a cylindrical beam pipe, each bunch enters the target material and interacts with a cylinder of target nuclei or target beam particles, comprising the target mass, having a length that is associated with the radius of gyration of the emulated target mass. The results of the interaction, in addition to the jerk or oscillation imparted to the target mass by nuclear reaction or collision, include back-scattered particles 5, secondary electrons 6, sputtered particles, forward-scattered particles (channeling) and recoil atoms as well as ion implantation.

The jerk-producing or oscillation-producing collisions involve elastic (single Coulomb) and inelastic (bresstrahlung) scattering impacts on nuclei and particles and sometimes result in a nuclear reaction, the products of which move out in a preferred direction based upon the alignment of the target 22. The particle beam bunch's front edge strikes the nuclei or particles in the cylindrical target-mass volume at a speed equal to the local GW speed. As each nucleus or other particle-beam target is impacted and is jerked or otherwise set in motion by the reaction to a nuclear products emission or collision, it generates GW in the direction of or normal to the beam's velocity and/or the alignment direction at the target nuclei and the GW grows in amplitude and emulates a large target mass having an effective radius of gyration larger than that of any single energizable element.

The GW can also be generated in the direction normal to a quadrupole (harmonic-oscillator) axis or in the direction of a is jerk, so that the particle-beam directed GW builds up or accumulates and generates a coherent GW as the beam particles progress through the target nuclei and thereby, emulates an extensive target mass. According to Douglas Torr and Ning Li (1993), Foundation of Physics Letters, Volume 6. Number 4, p.371 " . . . the lattice ions, . . . must execute coherent localized motion consistent with the phenomenon of superconductivity." Thus, a preferred embodiment is to have the target nuclei constrained in a cylindrical superconductivity state. As the particle-beam bunch moves down the cylinder of target nuclei, it strikes one target nuclei after another, creating a GW and adding to the forward-moving or radially-directed GW's amplitude as it progresses in step with the bunch's particles in the preferred direction in space of FIG. 1A 22 thereby emulating an extensive target mass. The particle-beam bunches are modulated by a particle-emission and/or chopper-control computer to impart information by modulating the generated GW. In addition, since the GW can be slowed by virtue of passing through a medium such as a superconductor (Li and Torr op. cit. 1992) and, therefore, refracted by it, as in a lens, the GW can be focused and intensified. The GW can also be venerated in a direction normal to a dipole axis. According to Joseph Weber (1964), Gravitation and Relativity, W. A. Benjamin Inc., New York, p. 91, a summation of charge times acceleration gives rise to dipole radiation, which also can be accomplish d gravitationally in a superconductor according to Li and Torr, op. Cit. 1992, pp. 5489ff and Torr and Li, op. Cit. 1993, pp. 371ff.

In another embodiment electron transfer dynamics between incident particle-beam gas molecule energizing elements, for example, nitric oxide, NO and a metal target surface composed of energizable elements such as Au (111) has been discussed by Yuhui Huang et al. (2000), Science, Volume 290, No. 5489, pp. 111–114. The large-amplitude vibrational motion associated with the energizable target molecules in high vibrational states strongly modulates the energy driving force of the energizing electron-transfer reaction. In this regard, although not discussed in any connection with GW generation, according to Huang, et al. (ibid, p. 113), " . . . the multiquantum vibrational transfer occurs on the subpicosecond time scale."

In order to accomplish experiments or communication with a GW generation or transmitter device, it is necessary to detect or receive GW. In this regard application Ser. No. 09/616,683, filed Jul. 14, 2000, now U.S. Pat. No. 6,417,597, describes such a detection device in which the collector elements replace the energizable elements of the present invention. The GW receiver is oriented in a direction from which the GW is known to be generated. The GW can be focused on the detection device by means of a refractive medium exhibiting a lense shape, as shown in FIG. 2, in order to amplify the GW intensity. Furthermore, since the GW frequency is also known, the collector elements of the GW receiver can be interrogated, that is, selectively connected by the control computer to an information-proc ssing device, in a sequence at the anticipated incoming GW frequency, that is, tuned. Thus, as the incoming GW pass through the ensemble of the GW receiver's collector elements, utilizing piezoelectric crystals, or capacitors, or strain gauges, or transducers, or parametric transducers, or nanomachines, etc., these elements are interrogated at the anticipated time of passage of the GW crest past them.

The uncertainty is in the determination of the GW phases. Within, for example, a subpicosecond time resolution, all of the possible GW phases (or times that the GW crest hits the leading rows of collector elements) are initially swept through by the control computer to establish the phase that correlates best with the maximum amplitude of the received GW signal, that is, tuned to the GW signal. After this initialization the GW phase is tracked by, say, a Kalman filtering technique described on pp. 384–392 of Robert M. L. Baker, Jr. (1967) Astrodynamics, Applications and Advanced Topics, Academic Press, New York. The small voltages and currents produced by some of the alternative collector elements can be measured, for example, by a superconducting quantum interference device (SQUID) using Josephson junctions (described in U.S. Pat. No. 4,403, 189) and/or by quantum non-demolition (QND) techniques utilized in optics but applied to the problem of reducing quantum-noise limitations for high-frequency GW. The QND technique was first suggested by Vladimir Braginsky of the Moscow State University and published by A. M. Smith (1978) in "Noise Reduction in Optical Measurement Systems)" IEE Proceedings, volume 125, Number 10, pp. 935–941. Superconductors are also contemplated for use in connection with the collection elements as discussed in the previous application, Ser. No. 09/616,683, filed Jul. 14, 2000, so that the collection elements can be in a superconducting state.

Referring again to U.S. Pat. No. 6,417,597 describes collector elements that can detect GW through the same conductors as are attached to the energizable elements for GW generation and are connected by an Individual Independently Programmable Coil System (IIPCS), a device that acts as a transceiver. The IIPCS is more fully described in U.S. Pat. No. 6,610,336. Such a control computer can connect the collector elements together and interrogate them in a pattern that will effectively sense GW incoming from a specific direction and, in like fashion, it can connect the energizer elements and energize them in a pattern that will effectively direct the radially or linearly propagating GW or steer them in a specific direction. It is valuable, therefore, both to scan for GW from a given set of directions, and to steer GW in a given set of directions, that is, to provide for directivity in both reception and transmission of GW. The control computer, acting in concert with the information-processing device, establishes a communications link between a GW receiver and a GW transmitter or, alternatively, among GW transceivers and establishes point to multipoint communication.

The aforementioned directivity can be best illustrated by FIG. 6. FIG. 6A exhibits a plan view of a typical section of an array of elements or element sets or subsets, the elements with indices 27, i, j, $\phi$k. $\phi$k represents the directivity angle, measured relative to some arbitrary fixed direction in space 30, of an individual element, either produced by active element alignment (by being in an electromagnetic field, in a superconducting state, spin polarized, etc.) or being an element set or subset, or by connecting to a specific member of an underlying stack of elements having the appropriate orientation fixed, of which the figures shows only the top member. In this latter case the i, j element stack may, for example, be 180 members high, each member offset from the next by one degree k=1 to 180) in the three-dimensional ensemble of elements. The central or control computer or information processing function is, therefore, a table look up of the indices that should be "on" for a given directivity and also located on the crest of the specific GW of interest (incoming or outgoing). An "on" element is one that is interrogated (for reception) or energized (for transmission).

In FIG. 6B the directivity angle to the preferred direction 22 is 180°. The elements on the anticipated GW crest 25 of interest of the GW 21 are communicated to collectors and interrogated (detection mode) or energized (generation mode). The prior locations of the GW crests 61 are behind the crest 25. In FIG. 6C the directivity angle is 135°, and the future locations of the crests 60 are in front of the crest 25.

Figure 6E:
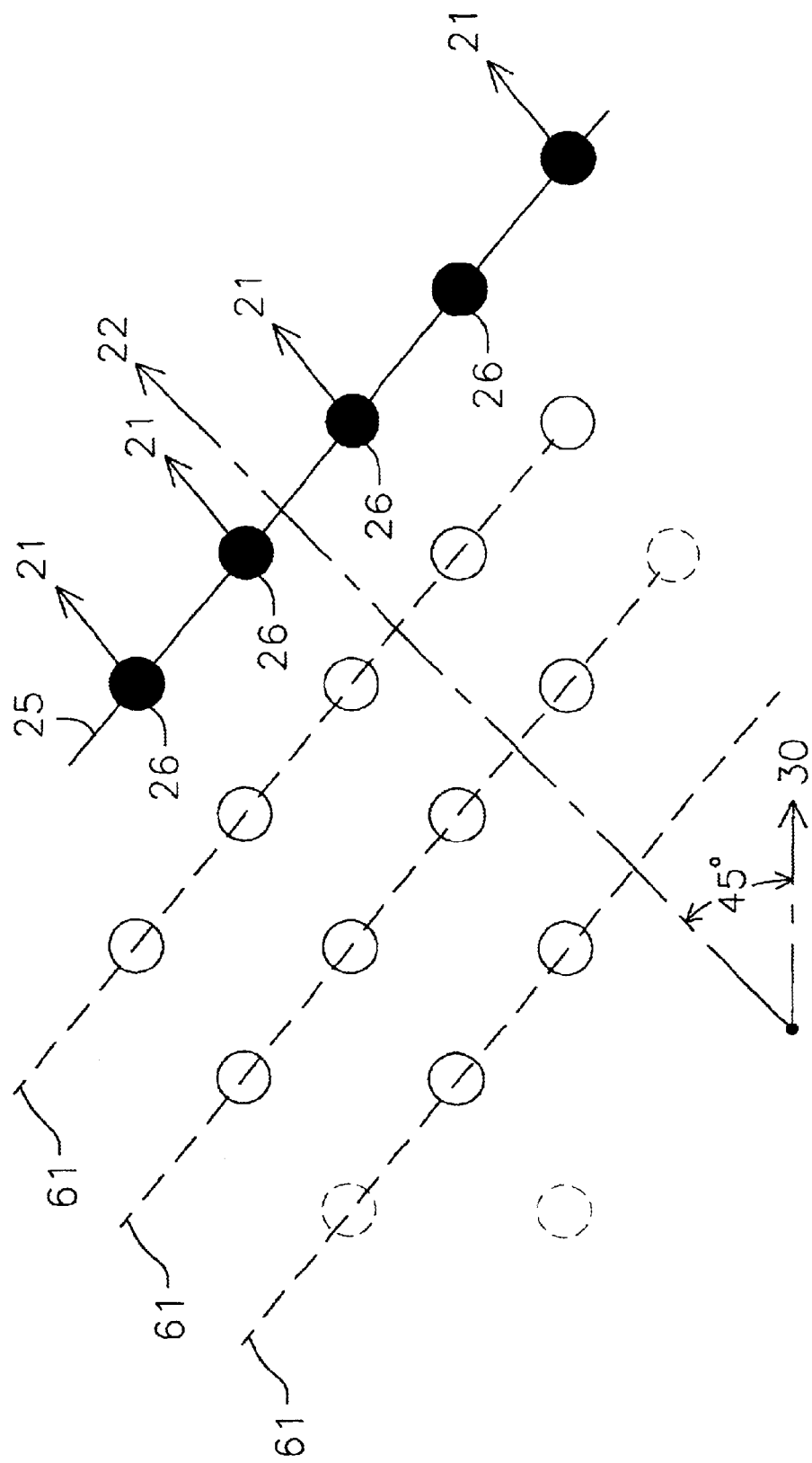
FIG. 6E is a diagram of the array of FIG. 6B with a directivity angle is 45°.

In FIG. 6D the directivity angle is 90°, in FIG. 6E it is 45°, and in FIG. 6F it is 0°. A coordinate rotation will afford directivity in three dimensions. In this latter regard, the elements could be arrays of elements or element sets or subsets and those arrays could be spherically isotropic in their activity as either collectors or energizable elements. In one embodiment, the element sets or subsets consist of piezoelectric crystals in a spherical configuration or array. Thus, GW can be sensed or generated in any direction. In this case, the piezoelectric crystals would be spread out evenly over the surface of a sphere 33 exhibited in FIG. 7. In a preferred embodiment each element would consist of a spherical piezoelectric crystal 33 with electrodes 31 spread out evenly over its surface and interrogated or energized in opposite pairs to achieve directivity in detection or generation of GW.

FIG. 7 illustrates the sphere 33 and the elements 31 (collectors or energizable) comprising the element sets or subsets. A typical member of this element set or subset, 32, has its directivity angles $\alpha_k$ and $\delta_k$ for the kth member of the element sets or subsets defined by the notation $\phi_k$ ($\alpha_k$, $\delta_k$). In one embodiment, the elements are piezoelectric crystals. In a preferred embodiment the elements are electrodes 31 attached to the surface 33 of a single, spherical piezoelectric crystal. Thus the propagation of the GW can be steered as opposite pairs of the electrodes are energized and detected from specific directions as the opposite pairs of electrodes, acting as collectors, are interrogated. Collectively the myriad of such spherical piezoelectric crystals can generate or detect a coherent GW by energizing or interrogating them in an appropriate pattern or sequence as illustrated in FIGS. 6B, 6C, 6D, 6E, and 6F.

NUMERICAL EXAMPLE

The specific relationship for GW generation by energizing elements, such as particle-beam particles, colliding with energizable elements, such as aligned target nuclei, will be an outcome of the use of the present invention described herein. To better understand that relationship, it is helpful to refer to the standard quadrupole approximation, Eq. (110.16), p.355 of L. C. Landau and E. M. Lifshitz, The Classical Theory of Fields, Fourth Revised English Edition, Pergamon Press, 1975 or Eq. (1), p.463 of J. P. Ostriker, ("Astrophysical Source of Gravitational Radiation in Sources of Gravitational Radiation," Edited by L. L. Smarr, Cambridge University Press. 1979) which gives the GW radiated power (watts) as $$P = -dE/dt = -(G/45c^5)K(d^3D_{\alpha\beta/dt^3})^2 \text{ [watts]} \quad (1)$$

where

E=energy [joules], t=time [s],

G=6.67423×10$^{-11}$ [m$^3$/kg-s$^2$] (universal gravitational constant, not the Einstein tensor), c=3×10$^8$ [m/s] (the speed of light), and $D_{\alpha\beta}$[kg-m$^2$] is the quadrupole moment-of-inertia tensor of the mass of the target particles, and the $\delta$ and $\beta$ subscripts signify the tensor components and directions. The quantity $(d^3D_{\alpha\beta}/dt^3)^2$ is the kernel at the quadrupole approximation.

Equation (1) can also be expressed as:

$$P = K_{I3dot}(d^3I/dt^3)^2/5 \ c^2 \text{ [watts]} \quad (2)$$

where I=($\Sigma$m)r$^2$ [kg-m$^2$], the moment of inertia, ($\Sigma$m)=sum of the masses of the individual target nuclei that are impacted by the particle beam, expel nuclear-reaction products, and caused to jerk or recoil in unison, [kg], (or, at least jerk or oscillate as the forward-moving GW front moves by), r=the effective radius of gyrations of the ensemble of target nuclei that constitute the target mass [m], and $K_{I3dot}$=a dimensionless constant or function to be established by experiment.

The third derivative of the moment of inertia is $$d^3I/dt^2 = (\Sigma m)d^3r^2/dt^3 = 2r(\Sigma m)d^3r/dt^3 + \ldots \quad (3)$$

and $d^3r/dt^3$ is computed by noting that $$2r(\Sigma m)d^2r/dt^2 = n2rf_n \text{ [N-m] (equation of motion)} \quad (4)$$

where n is the number of beam particles, which interact with target nuclei to emit nuclear-reaction products, and is the nuclear reactive force on a given target nuclei caused by the release of nuclear-reaction products. The third derivative is approximated by $$d^3I/dt^3 = n2r\Delta f_n/\Delta t \quad (5)$$

in which $\Delta f_n$ is the nearly instantaneous increase in the force on the ensemble of nuclei caused by the release of nuclear-reaction products or the collision impulse over the brief time interval, $\Delta t$. The $\Delta t$ is the nuclear-reaction time for a typical individual collision, taken here to be 10$^{-12}$ [s]. We will also take, for convenience of calculation, the time between emission of particle bunches also to be $\Delta t$. Thus the chopping frequency would be one THz.

As a bunch of beam particles strike the target nuclei material, the particles impact on the target nuclei, with, for example, 10% of them causing a nuclear reaction. In this regard, the characteristic length (or emulated or effective radius of gyration, r) of the target mass could be considered to be the thickness of the target mass or the distance that the particle-beam bunch moves at local GW speed before the number of particles in a given bunch is reduced by half or by some other measure of the effective radius of gyration of the target mass as the ensemble of energized particles comprising the target mass move in concert at local GW speed and emulate a cohesive target mass. The target nuclei are held in place by intermolecular forces that propagate at the local sound speed, that is, during the $\Delta t$ interval while the beam particles interact with the target nuclei and create aligned nuclear-reaction products, the particles move a distance v$\Delta t$, where v is the particle speed that is made equal to the local GW speed, VGW, but the nuclei move more slowly and influence one another at sound speed. Thus, alternative characteristic lengths could be either v$\Delta t$ or the distance local sound travels in at or the length of the target-mass cylinder, or the absorption thickness, etc. For the numerical example we will choose r=1 [cm]=0.01 [m] and the beam itself to have a cross-sectional area of one square centimeter. Thus for the numerical example the target mass is a cube one centimeter on a side and the generated GW rings from harmonic oscillation that move out in a plate or slab one centimeter thick.

With $K_{I3dot}$=32, as in the case of the GW radiated by the centrifugal-force jerk of a spinning rod, from Eq. (1), p.90 of Joseph Weber (1964), "Gravitational Waves in Gravitation and Relativity," Chapter 5, W. A. Benjamin, Inc., New York and Introducing Eq. (5), Eq. (2) becomes $$P = 1.76 \times 10^{-52}(n2r \ \Delta f_n/\Delta t)^2 \text{ [watts]} \quad (6)$$

The number of particles in a typical bunch is estimated to be approximately that of the Stanford Linear Collider (SLC) or $4 \times 10^{10}$ particles. It is estimated that 10% of the particles impact target nuclei and result in nuclear reaction (that is, a 10% harvest), so $n=4 \times 10^{10}$. Inserting these numbers into Eq. (6) we have $$P=1.76410^{-52}(4 \times 10^{10} \times 2 \times 0.01 \Delta f_n/\Delta t)^2 \text{ [watts]} \quad (7)$$

and, subject to further verification as to the mass defect and impulsive nuclear force, that is verification of the magnitude of the jerk, we take $\Delta f_n = 1 \times 10^{-6}$ [N] and $\Delta t = 10^{-12}$ [s] resulting in $$P=1.13 \times 10^{-22} \text{ [watts]}.$$

The reference area is either the rim of a disk one centimeter thick and one centimeter in diameter or $3.14 \times 10^{-4}$ [m$^2$] for a GW flux of $3.6 \times 10^{-19}$ [watts/m$^2$] for a harmonic oscillation of the target elements or one square centimeter for a linear jerk of the target elements (there is a factor of 0.5 since the GW is bifurcated—half moving in the direction of the jerk and half in the opposition direction). The former leads to a forward component of GW flux of $5.65 \times 10^{-19}$ [watts/m$^2$]. A lens system composed of a media in which the GW is slowed (such as a superconducting media) could concentrate or focus the GW from, say, a one square centimeter, to 10 micrometers$^2$ for an increase in GW flux of $10^5$ to $5.65 \times 10^{-13}$ [watts/m$^2$]. Note that in the refraction medium the GW wavelength is significantly smaller than 10 micrometers$^2$ at THz frequencies, so that GW diffraction, if present, is not very significant. All of the foregoing quadrupole equations are approximations to P. Due to the slowness of the GW, about one hundredth of light speed, the GW wavelength in the superconducting target is about $\lambda_{GW}$ $0.01c\Delta t = 3 \times 10^5 \times 10^{-12} = 3 \times 10^{-6}$ [m], but still larger than the radius of the target nuclei, beam particles, or nuclear-reaction products, so $\lambda_{GW}$ is much greater than the radius of the target particles and also, due to the slow propagation speed, all speeds are much less than c. Thus the quadrupole approximation is good, but still $K_{f3dot}$ will be further refined as will the harvest and other details of the energizing and jerk-producing or harmonic-oscillation-producing mechanism of the invention such as $\Delta f_n$ and $\Delta t$. The GW produced also is " . . . itself the source of some additional gravitational field" as noted by Landau and Lifshitz (op cit, 1979, p. 349) and discussed in the Propulsion section of U.S. Pat. No. 6,417,597. Thus attendant to the GW is a change in gravity that can be effectively utilized for the movement of mass and, hence, as a propulsion means.

Analysis of Binary Pulsar PSR 1913+16

As discussed in the Prior application Ser. No. 09/616,663, now U.S. Pat. No. 6,417,597, since binary pulsar PSR 1913+16 represents the only experimental confirmation of GW, the features and advantages of the present invention will be better understood by a further analysis of this double-star system. According to Robert M. L. Baker, Jr., p. 3 of "Preliminary Tests of Fundamental Concepts Associated with Gravitational-wave Spacecraft Propulsion," Paper No. 2000-5250 in the CD-ROM proceedings of the American Institute of Aeronautics and Astronautics Space 2000 Conference and Exposition, AIAA Dispatch: dispatch@lh1.lib.mo.us, or www.aiaa.org/publications, Sep. 19–21, 2000, the double star exhibits a mass of $m=2.05 \times 10^{30}$ [kg], a semi-major axis, a, of $2.05 \times 10^9$ [m], and a mean motion, n (or $\omega$) of $2.25 \times 10^{-4}$ [radians/s]. The average centrifugal force component or force-vector component subject to cage during the star pair's orbit, $\Delta f_{cfx,y}$, is $$man^2=(5.56 \times 10^{30})(2.05 \times 10^9)(2.25 \times 10^{-4})^2=5.77 \times 10^{32} \text{[N]}, \quad (8)$$

From Eq. (1), p. 90 of Joseph Weber, (op cit. 1964) and from Eq. (2) herein, one has for Einstein's formulation (1918, Sitzungsberichte, Preussische Akademi der Wisserschaften, p. 154) of the gravitational-wave (GW) radiated power of a rod spinning about an axis through its midpoint, having a moment of inertia, I [kg–m$^2$], and an angular rate, $\omega$ [radians/s]:

$$P=-32GI^2\omega^6/5c^5 = -G(I\omega^3)^2/5(c/2)^5 \text{ [watts]} \quad (9)$$

or $$P=-1.76 \times 10^{-52}(I\omega^3)^2 = -1.76 \times 10^{-52}(r[rm\omega^2]\omega)^2 \quad (10)$$

where using classical (not relativistic) mechanics, [rm$\omega^2$]$^2$ can be associated with the square of the magnitude of the rod's centrifugal-force vector, $f_{ct}$, for a rod of mass, m, and radius of gyration, r. This vector reverses every half period at twice the angular rate of the rod (and a component's magnitude squared completes one complete period in halt the rod's period). Thus the GW frequency is $2\omega$ and the time-rate-of-change of the magnitude of, say, the x-component of the centrifugal force, $f_{cfx}$ is $$\Delta f_{cfx}/\Delta t \propto 2f_{cfx}\omega. \quad (11)$$

(Note that frequency, $\upsilon=\omega/2\pi$.) The change in the centrifugal-force vector itself (called a "jerk" when divided by a time interval) is a differential vector at right angles to $f_{ct}$ and directed tangentially along the arc that the dumbbell or rod moves through. As previously mentioned, Equation (9) is an approximation and only holds accurately for $r<<\lambda_{GW}$ (wave length of the GW) and for speeds of the GW generator far less than c (the speed of light).

Equation (9) is the same equation as that given for two bodies on a circular orbit on p. 356 of Landau and Lifshitz, op. cit., 1975, (I=$\mu r^2$ in their notation) where $\omega=n$, the orbital mean motion.

As a validation of the use of a jerk to estimate gravitational-wave power, let us utilize the jerk approach for computing the gravitational-radiation power of PSR 1913+ 16. We computed in Equation (8) that each of the components of force change, $\Delta f_{cfx,y}=5.77 \times 10^{32}$ [N] (multiplied by two since the centrifugal force reverses its direction each half period) and $\Delta t=(\frac{1}{8})$ (7.75 hr$\times$60 min$\times$60 sec)=1.395$\times$ $10^4$ [s]. Thus using the jerk approach:

$$P=-1.76 \times 10^{-52}\{(2r\Delta f_{cfx}/\Delta t)^2+(2r\Delta f_{cfy}/\Delta t)^2\}=-1.76 \times 10^{-52}(2 \times 2.05 \times 10^5 \times 5.77 \times 10^{32}/1.395 \times 10^4)^3 \times 2=-10.1 \times 10^{24} \text{ [watts]} \quad (12)$$

versus $9.296 \times 10^{24}$ [watts] using Landau and Lifshitz's (op. cit., 1975, p. 356) more exact formulation given by the analyses of Baker (op. cit., 2000, p. 4) integrating using the mean anomaly. The stunning closeness of the agreement is, of course, fortuitous since due to orbital eccentricity there is no symmetry among the $\Delta f_{cfx,y}$ components around the orbit. Nevertheless, the value of the jerk approach is well demonstrated.

APPLICATION OF THE INVENTION TO COSMOLOGY

Since the present invention produces waves or ripples in the conjectured spacetimeuniverse (STU) continuum or fabric (see U.S. Pat. No. 6,160,336), it can be used to explore cosmological conjectures and theories. According to a thumbnail sketch of Einstein's theory of general relativity, time and space disappear with material things. That is, matter (stars to atomic nuclei) are inseparably connected to time and space and vice versa. "Things" are all but hills, valleys, and holes in the fabric of Einstein's spacetime.

It is conjectured that the equivalence of inertial and attractive mass and the unification of all forces, gravitational, centrifugal, electromagnetic, nuclear, etc. is that they are all simply undulations in the multidimensional STU fabric. We may consider a centrifugal force field to be a gravitational force field and elastic, thrust, drag, etc., force fields to be electromagnetic in origin. Thus force is a property of STU and vice versa. Such a concept is similar to that expressed by Schrödinger in 1946 (reported in Denis Brian's Einstein a life, 1996, John Wiley & Sons, p. 351) in his theory that " . . . purely wave theory, in which the structure of space-time would yield gravitation, electromagnetism, and even a classical analog of strong nuclear (forces)". In fact, the term "gravitational waves" could be replaced by the term "force waves" or "inertia waves" since it is the change in force, any force or attraction, or jerk of an inertial mass that results in the waves or ripples in the STU fabric.

Gravitational waves are related directly to an inertial mass in motion (caused by either a change in attraction or force—a jerk or harmonic oscillation) and not directly related to a gravitational field. In this regard, the wave/particles for such a force wave are proposed to be defined as "gravitational instantons" or "instantons". Such wave/particles would be analogous to photons associated with electromagnetic waves, gravitons associated with gravitational attraction, and gluons associated with strong nuclear forces. For historical reasons the term gravitational waves should be retained, whereas to avoid confusion with gravitons and the erroneous association of GW exclusively with gravitational attraction the term "instantons" is used.

There is a fundamental difference between photons, gravitons, gluons, etc., and instantons. The former are manifested by the curvature of the multidimensional STU fabric created by the attractions or forces associated with charge, mass, nuclear particles, etc. (all conjectured to be similar to gravity, that is, not really "forces", but motion along convergent or divergent geodesics in the multidimensional STU), whereas the latter is manifested by the rapid changes in the forces or jerk or oscillation associated with the former—like "cracking a whip" or "striking a drum head" of STU fabric to produce ripples in the STU fabric as Landau and Lifshitz (op cit, p. 355) suggest, such STU fabric distortions caused by high-frequency gravitational waves (expressed as instantons) change gravity (expressed as gravitons) itself. Thus all the properties of wave/particles, like diffraction and dispursion, may not be present in the instantons.

Continuing with the thumb-nail-sketch conjectures of the STU continuum at the most elementary level, the inherent uncertainty in position and velocity (as opposed to the practical, experimental inability to exactly define position and velocity simultaneously) is simply a reflection of the fact that you can't "see" the entire STU panorama from any one single vantage point. Thus there can be complete determinism, cause and effect can prevail, and "God does not have to play dice", because everything is in the STU fabric, for example, in different universes at different times everything cannot be "seen". A "line" cannot connect "points" in the STU fabric, but the "points" are still there and their "motion" on the fabric is predictable; but, unfortunately, they can't be "seen" or predicted simultaneously. The more conventional spacetime continuum is embedded in the multidimensional STU, which is a multidimensional manifold.

As far as quantum mechanics is concerned, the detailed surface of the STU fabric can be thought of as ribbed or like steps—essentially quantum steps. According to this conjecture the intractable frontier between " . . . a smooth spacial geometry . . . " and " . . . the violent fluctuations of the quantum world on short distances . . . the roiling frenzy of quantum foam." (Brian Greene, 1999, the elegant universe, Norton, New York, p. 129) is nothing more or less than the interface between osculating universes on small scales in which entities shift back and forth at will—actually smooth transitions with mass/energy and momentum conserved and entropy constant. Thus the measurement of the fundamental constants in a given universe are subject to a very small variation depending upon "where" (or "when") they are measured.

In this regard, "where" has a more global meaning. In the STU "where" is similar to position in conventional space (but a continuum of dimensions). On the other hand "where" and what are time-like universe dimensions. In "our" universe its simply "time-when." These extremely simplified general cosmological conjectures would require very complicated mathematics in order to obtain quantitative results and make them more than just superficial fantasies. Thus the present invention would be useful in obtaining experimental insights concerning the foregoing conjectures and confirmation of quantitative cosmological theories and predictions. Also the receiver aspect of the invention, as it relates to the detection of high-frequency GW, would be useful in studying the "Big Bang" information imprinted on GW background between about $10^{-25}$ and $10^{-12}$ [s] after its start.

What is claimed is:

1. A gravitational wave generating device comprising:
   a plurality of target nuclei in a constrained state,
   a source of submicroscopic particles directed at the target nuclei,
   a computer-controlled logic system operatively connected to the particle source for selectively propelling the particles toward the target nuclei to cause products of a nuclear reaction to be emitted from the nuclei, and
   a containment system for aligning the products of the nuclear reaction such that the products move in approximately the same direction, produce a third time derivative of the motion of the target nuclei reacting to the emitted products of the nuclear reaction and thereby generate gravitational waves in that direction.

2. A device according to claim 1 in which the plurality of target nuclei are contained in a superconducting medium.

3. A device according to claim 1 in which the plurality of target nuclei comprises a fluid.

4. A device according to claim 3 wherein the fluid includes electrons.

5. A device according to claim 3 in which the fluid is a superconducting fluid.

6. A device according to claim 1 in which the plurality of target nuclei comprises a gas.

7. A device according to claim 1 in which the plurality of target nuclei are constrained in an electromagnetic field.

8. A device according to claim 7 in which the electromagnetic field is external to the plurality of target nuclei.

9. A device according to claim 7 in which the electromagnetic field is ferromagnetic.

10. A device according to claim 7 in which the electromagnetic field comprises intermolecular forces.

11. A device according to claim 1 in which the plurality of target nuclei are aligned in a spin-polarized state.

12. A device according to claim 1 in which the source of particles for producing nuclear-reaction products is a pulsed particle beam.

13. A device according to claim 12 in which the particles comprising the particle beam are photons.

14. A device for generating gravitational waves comprising a source of products of nuclear reactions under the control of a computer-controlled logic system to produce a third time derivative of the motion of energizable elements and thereby generate gravitational waves.

15. A gravitational wave generating device comprising:
a plurality of target energizable elements,
a plurality of energizing elements that act on the energizable elements, and
a computer controlled logic system operatively connected to the energizing elements to control the action of the energizing elements so as to produce a third time derivative of the motion of the energizable elements or a jerk and thereby generate gravitational waves.

16. A device according to claim 15 in which the energizable elements are molecules.

17. A device according to claim 15 in which the energizable elements are atoms.

18. A device according to claim 15 in which the energizable elements are atomic nuclei.

19. A device according to claim 15 in which the energizable elements are nuclear particles.

20. A device according to claim 19 in which the nuclear particles are electrons.

21. A device according to claim 15 in which the energizing elements are an anisotropic particle beam.

22. A device according to claim 21 in which the beam particles collide with the energizable elements and produce a third time derivative of the motion of the energizable elements and generate gravitational waves.

23. A device according to claim 22 in which the beam particles collide with the energizable elements to produce a nuclear reaction that causes the ejection of nuclear reaction products that result in a third time derivative of the motion of the energizable elements.

24. A device according to claim 15 in which the energizing elements are an isotropic particle beam.

25. A device according to claim 15 in which the energizing elements create a multiquantum vibrational event for the energizable elements on a subpicosecond time scale and generate gravitational waves.

26. A device according to claim 15 in which the energizing elements are microwaves.

27. A device according to claim 15 in which the energizing elements are one or more magnetic fields.

28. A device according to claim 15 in which the energizing elements are one or more electric fields.

29. A device according to claim 15 in which the energizing elements move in sequence to define a gravitational-wave front and energize the energizable elements in sequential order to generate and accumulate gravitational-wave energy as the gravitational-wave front progresses.

30. A device according to claim 29 in which the gravitational waves comprising the wave front are coherent.

31. A device according to claim 15 in which the energizing elements are photons of a laser.

32. A device according to claim 15 in which the energizing elements are electrons.

33. A device according to claim 15 in which the energizing elements are protons.

34. A device according to claim 15 in which the energizing elements are neutrons.

35. A device according to claim 15 in which the energizing elements are nuclear particles.

36. A device according to claim 15 in which the energizing elements are atomic nuclei.

37. A device according to claim 15 in which the energizing elements are molecules.

38. A device according to claim 37 in which the molecules are ionized.

39. A device according to claim 15, in which the energizing elements are current-carrying coils.

40. A device according to claim 15, in which the energizable elements are one or more permanent magnets.

41. A device according to claim 40 in which the permanent magnets are submicroscopic.

42. A device according to claim 15, in which the energizable elements are one or more electromagnets.

43. A device according to claim 42 in which the electromagnets are submicroscopic.

44. A device according to claim 15, in which the energizing elements are current-carrying electrical conductors.

45. A device according to claim 15, in which the energizable elements are current-carrying electrical conductors.

46. A device according to claim 15 in which the energizable elements are energized in a pattern in order to achieve directivity in gravitational wave transmission.

47. A device according to claim 46 in which the directivity is changed over time in order to control the direction of the gravitational wave transmissions.

48. A device according to claim 46 in which the energizing elements are energized in a pattern that will transmit gravitational waves to a radiating gravitational wave transmitter in order to establish a GW communications source.

49. A device according to claim 46 in which the pattern produces constructive interference among some of the gravitational waves.

50. A device according to claim 46 in which the pattern produces destructive interference among some of the gravitational waves.

51. A device according to claim 15 in which the energizable elements are harmonic oscillators.

52. A device according to claim 15 in which the energizable elements are capacitors.

53. A device according to claim 15 in which the energizable elements are disposed in a spherical array.

54. A device according to claim 53 in which the spherical array comprises piezoelectric crystals spread evenly over the surface of a sphere.

55. A device according to claim 53 in which the energizable element comprise a spherical piezoelectric crystal or crystals.

56. A device according to claim 55 in which actuating electrodes are spread evenly over the surface of the piezoelectric crystals and operatively connected to a power source controlled by a computer-controlled logic system.

57. A device according to claim 15 in which a refractive medium concentrates or focuses the gravitational waves emitted by the gravitational wave generator.

58. A device according to claim 15, in which the energizable elements are piezoelectric crystals.

59. A device according to claim 15, in which the energizable elements are nanomachines.

60. A device according to claim 59 in which the nanomachines are harmonic oscillators.

61. A device according to claim 59 in which the nanomachines are nanomotors.

62. A device according to claim 59 in which the nanomachines are solenoids.

63. A device according to claim 59 in which the nanomachines are microelectromechanical systems (MEMS).

64. A device according to claim 15 in which the energizing elements are antiprotons.

65. A device according to claim 15 in which the energizable elements are antiprotons.

66. A device according to claim 15 in which the energizable elements are enveloped in a dielectric.

67. A device according to claim 66 in which the dielectric has a spherical form.

68. A device according to claim 15 in which the energizing elements are sources of electromagnetic radiation.

69. A device according to claim 15 in which the energizable elements are submicroscopic particles.

70. A device according to claim 15 in which the computer-controlled logic system is a modulator.

71. A device according to claim 15 in which the energizable elements are maintained in a state of superconductivity.

72. A device according to claim 15 in which the computer-controlled logic system is a vehicle trajectory or orbit determination processor.

73. A gravitational wave detection device comprising gravitational-wave collector elements that are interrogated by a computer-controlled logic system according to an expected arrival time of the crests of a gravitational wave of a predetermined gravitational wave frequency and phase in order to be a tuned gravitational wave receiver.

74. A device according to claim 73 in which the interrogations continue as the gravitational wave phase is determined and locked on by a control computer.

75. A device according to claim 73 in which the collector elements are transducers.

76. A device according to claim 75 in which the transducers are parametric transducers.

77. A device according to claim 75 in which the transducers measure the curvature of the spacetime continuum.

78. A device according to claim 73 in which the collector elements are capacitors.

79. A device according to claim 73 in which the collector elements are harmonic oscillators.

80. A device according to claim 73 in which signals from the collector elements can be measured by a superconducting quantum interference device (SQUID).

81. A device according to claim 73 in which the signal from the collector elements are sensed using quantum non-demolition (QND) techniques.

82. A device according to claim 73 in which the collector elements are interrogated in a pattern according to an expected incoming gravitational wave direction in order to achieve directivity in GW reception.

83. A device according to claim 73 in which the directivity is changed over time in order to scan for gravitational wave transmissions.

84. A device according to claim 73 in which the collector elements are disposed in a spherical array.

85. A device according to claim 84 in which the spherical array of collector element comprises a plurality of piezoelectric crystals spread evenly over the surface of a sphere.

86. A device according to claim 84 in which the collector element comprise spherical piezoelectric crystals.

87. A device according to claim 86 in which actuating electrodes are spread evenly over the surface of the piezoelectric crystals and operatively connected to a computer-controlled logic system.

88. A device according to claim 73 in which the collector elements are submicroscopic.

89. A device according to claim 73 in which the tuned gravitational wave receiver receives gravitational waves refracted by a medium positioned in front of the gravitational-wave receiver.

90. A device according to claim 89 in which the medium is a superconducting medium.

91. A device according to claim 89 including a lens for concentrating or focusing the gravitational waves.

92. A device according to claim 89 including a series of gravitational-wave refracting media for concentrating or focusing the gravitational waves.

93. A device according to claim 73 in which the collector elements are maintained in a state of superconductivity.

94. A gravitational wave communications device comprising:
   a gravitational wave generator for producing gravitational waves having a particular frequency and amplitude as determined by the frequency and amplitude of the jerks of the masses comprising the gravitational wave generator,
   a modulator connected to the generator for imparting information to the gravitational waves by modifying their frequency and amplitude,
   a computer-controlled logic system for controlling the frequency and amplitude of the jerks,
   a detector for receiving the modulated gravitational waves having a particular frequency and amplitude, and
   a demodulator controlled by a computer-control logic system for extracting the information from the frequency and amplitude of gravitational waves and delivering it to a presentation device.

95. A gravitational wave communications device comprising:
   a plurality of target nuclei aligned in a constrained state,
   a source of submicroscopic particles directed at the target nuclei,
   a computer-controlled logic system operatively connected to the particle source for selectively propelling the particles toward the target nuclei to produce a nuclear reaction,
   a containment system for aligning the products of the nuclear reaction such that the particles move in approximately the same direction, produce a third time derivative in the motion of the target nuclei and thereby generate gravitational waves, and
   a transmitter operatively connected to the containment system for selecting the number of particles propelled at any given time to modulate the gravitational waves.

96. A device according to claim 95 wherein the transmitter includes a modulator.

97. A device according to claim 96 in which the modulator imparts information to the gravitational waves by selecting their frequency and amplitude.

98. A device according to claim 97 including a detector at a remote location for receiving the modulated gravitational waves.

99. A device according to claim 98 including a demodulator connected to the detector.

100. A device according to claim 99 including a presentation device connected to the demodulator.

* * * * *